United States Patent [19]
Hiyoshi

[11] Patent Number: 5,734,703
[45] Date of Patent: Mar. 31, 1998

[54] HYBRID CIRCUIT AND DATA COMMUNICATION APPARATUS

[75] Inventor: Yuichiro Hiyoshi, Ibaraki-ken, Japan

[73] Assignee: Hitachi Maxell, Ltd., Osaka, Japan

[21] Appl. No.: 348,940

[22] Filed: Nov. 25, 1994

Related U.S. Application Data

[63] Continuation-in-part of Ser. No. 248,153, May 24, 1994, abandoned.

[30] Foreign Application Priority Data

May 26, 1993 [JP] Japan ................................ 5-124180

[51] Int. Cl.$^6$ ........................................ H04M 11/00
[52] U.S. Cl. ..................... 379/98; 379/399; 379/402; 379/405; 379/412
[58] Field of Search ....................... 379/377, 398, 379/399, 402, 405, 406, 412, 90, 93, 98; 375/222, 220

[56] References Cited

U.S. PATENT DOCUMENTS

| | | | |
|---|---|---|---|
| 2,629,024 | 2/1953 | Edwards | 379/405 |
| 3,955,051 | 5/1976 | Bitzer et al. | |
| 4,045,615 | 8/1977 | James et al. | 379/204 |
| 4,056,719 | 11/1977 | Waaben | 359/161 |
| 4,086,447 | 4/1978 | Schindler et al. | 379/405 |
| 4,132,870 | 1/1979 | Liu | 379/156 |
| 4,190,747 | 2/1980 | Feiner et al. | |
| 4,203,006 | 5/1980 | Mascia | 379/98 X |
| 4,656,318 | 4/1987 | Noyes | 379/93 |
| 4,864,605 | 9/1989 | Ramsay et al. | 379/379 |
| 5,245,654 | 9/1993 | Wilkison et al. | 379/405 |
| 5,369,687 | 11/1994 | Farkas | 379/98 |
| 5,426,697 | 6/1995 | McGrane | 379/398 |
| 5,481,606 | 1/1996 | Andrieu et al. | 379/399 |
| 5,555,293 | 9/1996 | Krause | 379/98 |

FOREIGN PATENT DOCUMENTS

| | | | |
|---|---|---|---|
| 2910951 | 10/1980 | Germany | 379/399 |
| 54-136252 | 10/1979 | Japan | |
| 62-208724 | 2/1983 | Japan | |
| 60-102030 | 6/1985 | Japan | 379/402 |
| 3-32147 | 2/1991 | Japan | |
| 4-096597 | 3/1992 | Japan | 379/402 |
| 4-223622 | 12/1992 | Japan | |

OTHER PUBLICATIONS

S. Yoneda et al., Windingless Hybrid Repeating Coil Using Photo–Coupler, May 1977, pp. 549–556, 27th Elect. Comp. Conf.

Shijiro Yoneda et al., Solid–State Two– to Four–Wire Hybrid Function, Jun. 1979, pp. 269–272, IEEE Transactions on Components, Hybrids And Manufacturing Technology, vol. CHMT–2, No. 2.

CMOS Integrated Circuit Data Book, Jan. 1992, Sierra Semiconductor pp. 200–201.

"Phone–Liu Autocoupler", Hagens et al.; Electronics Now, Jun. 1993 pp. 63–67,72.

*Primary Examiner*—Krista M. Zele
*Assistant Examiner*—Scott L. Weaver
*Attorney, Agent, or Firm*—Birch, Stewart, Kolasch & Birch, LLP

[57] ABSTRACT

The balancing bridge circuit is provided between a four-wire circuit and a two-wire circuit, to provide a thin-type balancing bridge circuit having satisfactory transmission characteristics and a MODEM and an exchange and a repeater of a telephone circuit having this balancing bridge circuit built therein. The transmitting terminals of the four-wire circuit and the connection points of the balancing bridge circuit are connected together through the photo-coupler. The receiving terminals of the four-wire circuit and the connection points of the balancing bridge circuit are connected together through the photo-coupler. The terminals of the two-wire circuit are connected to the connection points of the balancing bridge circuit. By the presence of the compact photo-couplers, it is possible to ground the transmitting terminal and the receiving terminal together. Common-mode noise reaching the terminals is not transmitted to the receiving terminals.

13 Claims, 28 Drawing Sheets

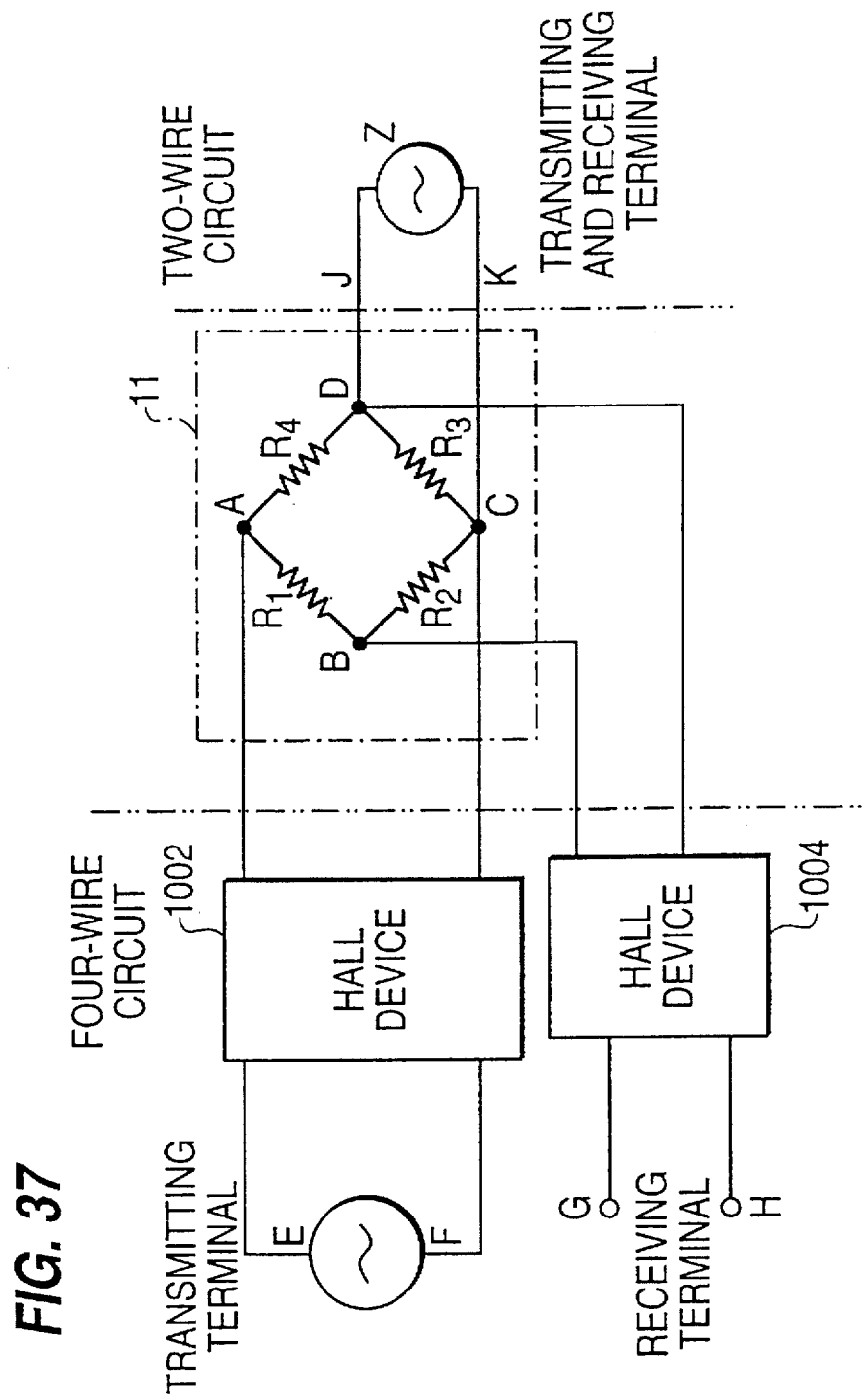

HYBRID CIRCUIT AND DATA COMMUNICATION APPARATUS

CROSS-REFERENCE TO RELATED APPLICATIONS

This application is a continuation-in-part of patent application Ser. No. 08/248,153 filed May 24 1994, now abandoned, the contents of which are incorporated herein by reference.

BACKGROUND OF THE INVENTION

The present invention relates to a hybrid circuit for carrying out a four-wire to two-wire conversion of a channel, and to a data communication unit such as a MODEM for incorporating the hybrid circuit. The present invention also relates to a MODEM front end unit having a unit for insulating between terminals of a four-wire circuit and a two-wire circuit respectively and a data communication unit.

In order to carry out data communication through a public circuit switching network, it is necessary to have a MODEM, and it is further necessary to have a hybrid circuit for carrying out a four-wire to two-wire conversion of the channel.

FIG. 35 shows a block diagram of a structure of a MODEM connected between a personal computer and a public circuit switching network. This MODEM includes a terminal interface 1, a controller 2, a digital signal processing unit 3, and a front end unit 4. The front end unit 4 includes a four-wire to two-wire hybrid circuit 5 and a network control unit 6.

U.S. Pat. No. 3,955,051 or "CMOS Integrated Circuit Data Book, January 1992", pp. 200-201 teaches a hybrid circuit. None of these conventional hybrid circuits provides an isolation between the four-wire circuit and the two-wire circuit, and therefore, these hybrid circuits can not be connected to the public circuit. In order to overcome this difficulty, a line transformer L has been provided in the conventional hybrid circuit 5 in the front end unit 4 to make it possible to carry out data communication, while providing isolation between the circuits, as shown in FIG. 36. However, there is a tendency that a line transformer for data transmission with better transmission characteristics requires a larger external size. Therefore, in order to obtain practically satisfactory transmission characteristics for a transformer having an inductance of about one Henry and an isolation breakdown voltage of about 1000 V for a circuit current, at least one centimeter thickness of the line transformer is required. Consequently, there has been a limit on the degree to which the front end 4 can be made compact and thin. To pursue greater compactness and a thinner size for the front end unit 4, it is essential to develop a circuit structure which enables data transmission while obtaining an isolation between the circuits, without using a line transformer or the like. The isolation breakdown voltage of a front end circuit using a capacitor instead of a transformer will be about 250 V.

Further, there has been known a conventional four-wire to two-wire conversion hybrid circuit including an operational amplifier for preventing a transmission signal from being leaked to receiving terminals, and providing isolation between the bridge circuit and the transmitting terminals and between the bridge circuit and the receiving terminals respectively. As a known example of this type of hybrid circuit, there is Japanese Patent Unexamined Publication No. JP-A-4-223622.

Further, there has been known a conventional circuit controller for a facsimile device including a pulse modulation circuit and an opto-coupler or photocoupler for sending pulse signals. As a known example of this type, there is Japanese Patent Unexamined Publication No. JP-A-3-32147.

The above-described conventional MODEM front end unit includes: a balancing resistance bridge circuit; transmitting terminals (transmitter output terminals) and receiving terminals (receiver input terminals), one end of which respectively, are grounded, and the bridge circuit, of which at least one set of two-set balancing points are floated from the ground, because they need to be mutually isolated or insulated. It is also necessary to prevent a signal applied to the bridge circuit from the transmitting terminals from being leaked to the receiving terminals. For the above purposes, according to the conventional hybrid circuit using the bridge circuit, an operational amplifier has been used in combination, and a transmission signal has been cancelled by the operational amplifier at the signal receiving side to prevent a leakage of the signal to the receiving terminals. Thus, the operational amplifier has been indispensable.

It has become clear, however, that, according to the balancing bridge hybrid circuit using the above-described operational amplifier, it is not possible to effectively remove common-mode noise coming from the two-wire circuit (noise which occurs common-mode on two lines that structure the two-wire circuit). In other words, it has become clear that when the frequency of common-mode noise is within an operating frequency band of the operational amplifier at the signal receiving side, a larger portion of the common-mode noise is canceled by the operational amplifier and the noise does not appear in the receiving terminals during this period, but when the frequency of the common-mode noise is so high as to exceed the operating frequency band of the operational amplifier, there is a problem that the intrinsic operation of the operational amplifier is not carried out and the noise appears in the receiving terminals.

Further, there has been a following problem when an isolation is provided by using a photo-coupler in the front end of the MODEM.

Depending on variations of manufacturing of a photo-coupler and changes of temperature, the current transmission rate of the photo-coupler (which expresses the relation between the secondary current that is an output current of the light receiving device and the primary current that is a drive current of the light emitting device) usually has a large variation of six times. Accordingly, when the photo-coupler is used in the line interface portion of the MODEM, variations of the receiving power which occur due to variations of the current transmission rate can be eliminated by the operation of the AGC within the MODEM at the signal receiving time, but there is a risk that when variations of a transmission power occur due to variations of the current transmission rate at the signal transmission time the power may exceed the prescribed maximum transmission power.

As a method for compensating for such variations of the transmission power as described above, a method of stabilizing the amplitude by providing an AGC circuit or a method of providing a variable resistor for adjusting the transmission output may be considered. However, the former method has a problem that data signals, and DTMF signals of which levels are mutually different from each other, are treated such that the signal levels of these signals are the same. This former method can not be applied to the quadrature amplitude modulation system (QAM). On the other hand, the latter method has a problem that adjustments are required for each MODEM, which is very time consuming.

Usually, a MODEM (to be used by being connected to a terminal device such as a personal computer or the like) operates based on a current supplied from the terminal device. As a power source voltage, 5 V has been used for a portable terminal device. However, due to a need for a compactness of the power source, a lithium secondary battery or an MH battery has generally been used for the power source of the terminal device. Therefore, 3.3 V may be considered as a standard for an operating voltage, with about 2.4 V being used for some devices.

However, even if the MODEM can operate at a low voltage as described above, a maximum transmission power required by the line interface device can not be reduced because the signal level of the telephone circuit has been determined by the standard. When the power source voltage of the card-type MODEM is lowered to 3.3 V or 2.4 V, the above-described conventional method has a problem that a shortage of the maximum transmission power of the line interface device becomes serious.

SUMMARY OF THE INVENTION

As a result of various studies carried out on the above problem, it has been found in the present invention that the above problem can be eliminated by a combined use of an isolation interface device such as an optically coupled device (a photo-coupler, for example) in the balancing bridge hybrid circuit.

It is, therefore, the first object of the present invention to provide a hybrid circuit which eliminates the above-described problem of the prior-art technique by a combined use of an isolation interface device, such as an optically coupled device, at a four-wire circuit side of the balancing bridge hybrid circuit, to thereby make it possible to insulate the transmitting terminals and the receiving terminals at the four-wire circuit side from the bridge circuit, without using an operational amplifier, to prevent the transmission signal from being leaked to the receiving terminals, and to effectively remove common-mode noise from the two-wire circuit to the high-frequency range.

It is the second object of the present invention to provide a front end unit which has satisfactory transmission characteristics in a thin structure.

It is the third object of the present invention to provide a compensation circuit of the photo-coupler and a MODEM using the same which can solve the above-described problems and which can restrict an influence of variations of the current transmission rate of the photo-coupler.

It is the fourth object of the present invention to provide a line interface device of a MODEM which can eliminate the above-described objects and which can reduce the power source voltage and increase a maximum transmission power at the terminal device side.

In order to achieve the above-described objects, the present invention has been structured as follows.

(1) In a hybrid circuit for carrying out a four-wire to two-wire conversion of a channel, a balancing bridge circuit is provided between terminals of a four-wire circuit and terminals of a two-wire circuit, and an isolation interface device is provided between the bridge circuit and transmitting terminals of the four-wire circuit and between the bridge circuit and receiving terminals of the four-wire circuit respectively.

(2) In a hybrid circuit for carrying out a four-wire to two-wire conversion of a channel, a balancing bridge circuit is provided between terminals of a four-wire circuit and terminals of a two-wire circuit, a secondary side of a transmitting optically coupled device of the four-wire circuit is connected between balancing points at one side of the bridge circuit and a primary side of a receiving optically coupled device of the four-wire circuit is connected between balancing points at the other side of the bridge circuit, terminals of the two-wire circuit are connected between desired adjacent connection points of the bridge circuit, a primary side of the transmitting optically coupled device is connected to transmitting terminals of the four-wire circuit, and a secondary side of the receiving optically coupled device is connected to receiving terminals of the four-wire circuit.

(3) In a hybrid circuit for carrying out a four-wire to two-wire conversion of a channel, a balancing bridge circuit including two series-connected resistors or impedances and two series-connected isolation interface devices is provided between terminals of a four-wire circuit and receiving terminals of a two-wire circuit. The two isolation interface devices are connected individually to two receiving terminals of the four-wire circuit, and another isolation interface device is provided between the bridge circuit and transmitting terminals of the four-wire circuit.

(4) In a hybrid circuit for carrying out a four-wire to two-wire conversion of a channel, a balancing bridge circuit is provided between terminals of a four-wire circuit and terminals of a two-wire circuit, a first two adjacent sides of the bridge circuit are formed from series-connected resistors or impedances, and the remaining two adjacent sides of the bridge circuit are formed from by primary sides of two series-connected two receiving optically coupled devices. A secondary side of a transmitting optically coupled device is connected between a connection point of two resistors of the bridge circuit and a connection point of the two receiving optically coupled devices. Terminals of the two-wire circuit are connected between desired adjacent connection points of the bridge circuit, a primary side of the transmitting optically coupled device being connected to transmitting terminals of the four-wire circuit, and a secondary side of the receiving optically coupled device being connected to receiving terminals of the four-wire circuit.

(5) In the hybrid circuit for carrying out a four-wire to two-wire conversion of the channel in (4) above, secondary sides of the two optically coupled devices are connected in series and a receiving output is obtained from one of the terminals and a connection point between the secondary sides.

(6) In the hybrid circuit for carrying out a four-wire to two-wire conversion of the channel in (4) above, outputs obtained from the secondary sides of the two optically coupled devices are differentially coupled to obtain a receiving output.

(7) In a hybrid circuit for carrying out a four-wire to two-wire conversion of a channel, a balancing bridge circuit is provided between terminals of a four-wire circuit and terminals of a two-wire circuit. A secondary side of a transmitting optically coupled device of the four-wire circuit is connected between balancing points at one side of the bridge circuit. Primary sides of a pair arranged in receiving optically coupled devices, of a push-pull configuration are connected between balancing points at the other side of the bridge circuit. Terminals of the two-wire circuit are connected between desired adjacent connection points of the bridge circuit, a primary side of the transmitting optically coupled device being connected to transmitting terminals of the four-wire circuit, and a secondary side of the receiving optically coupled device being connected to receiving terminals of the four-wire circuit.

(8) In the hybrid circuit for carrying out a four-wire to two-wire conversion of the channel in (2), (4) or (7) above, at least one of the receiving optically coupled devices and the transmitting optically coupled devices is connected at its secondary side with a load circuit which operates as a constant voltage circuit when a DC flows and which also works as a constant current circuit when an AC flows.

(9) In the hybrid circuit for carrying out a four-wire to two-wire conversion of the channel in (1) or (3) above, a current detector using an optically coupled device or a Hall element, or an isolation amplifier including a transistor and a fine transformer for supplying a base current to the transistor, can be used for each isolation interface device.

(10) In the hybrid circuit for carrying out a four-wire to two-wire conversion of the channel in (1) to (9) above, one side of the balancing bridge circuit is by a portion of the two-wire circuit.

(11) In a communication unit equipped with a transmitter, a receiver and a transmitting and receiving antenna, a balancing bridge circuit is provided of which three sides or legs are structured by resistors or impedance devices and the remaining one side is structured by the transmitting and receiving antenna. The transmitter is coupled between balancing points at one side of the bridge circuit and the receiver is coupled between balancing points at the other side of the bridge circuit. An optically coupled device is provided in the coupling portion between the bridge circuit and the transmitter or in the coupling portion between the bridge circuit and the receiver.

(12) In order to achieve the third object of the present invention, in a MODEM for carrying out an isolation by using a optical coupling device in the front end portion, the photo-coupling device is one of line interface devices in which the current transmission rate is distributed around a standard value and includes a variable gain amplifier for amplifying an output of the photo-coupling device, a current transmission rate measuring circuit for measuring a current transmission rate of the photo-coupling device and a gain control circuit for controlling the gain of the variable gain amplifier based on the measured current transmission rate, and the gain control circuit has in the secondary side of the transmission photo-coupling device a photo-coupling device compensation circuit for controlling a gain of the variable gain amplifier so that a maximum output can be obtained from the variable gain amplifier when the measured current transmission rate shows a standard value.

(13) In order to achieve the third object of the present invention, the photo-coupler compensation circuit according to the present invention includes an AC extracting unit for filtering an AC signal of the output signal of the receiving device, a DC extracting unit for extracting a DC signal of the output voltage of the light receiving device and a dividing unit for dividing the AC signal with the DC signal.

The photo-coupler compensation circuit according to the present invention includes a FET (field effect transistor) which operates in the variable resistance area with an output voltage of the light receiving device being supplied to the source, and an integrator which is supplied with a constant reference signal and which integrates a difference between a DC voltage obtained between the source and the drain of the FET and the reference voltage. An output of the integrator is supplied to the gate of the FET as a control voltage, so that the DC voltage obtained between the source and drain of the FET becomes equal to the reference voltage. A signal on the source of the FET is a result of dividing the AC signal of the light receiving device by the DC signal of the light receiving device.

Further, the MODEM according to the present invention is connected to the telephone circuit through the photo-coupler equipped with the compensation circuit according to the present invention and carries out an isolation from the telephone circuit.

(14) In order to achieve the fourth object of the present invention, one of signal lines of a two-wire circuit is connected to the output signal line of the transmitting portion and is also connected to one of terminals of an impedance matching device through the receiving portion, and a unit is provided which supplies a signal that is in the same phase and has the same amplitude with the transmission signal to be supplied to the one terminal of the impedance matching device, to the other terminal of the impedance matching device from the transmitting portion through the receiving portion at the time of transmission.

The operation based on the above-described structures will be explained below.

As shown in FIG. 34, transmitting terminals E and F of a four-wire circuit are connected to connection points A and C of a balancing bridge circuit, receiving terminals G and H of the four-wire bridge circuit are connected to connection points B and D of the balancing bridge circuit, and transmitting and receiving terminals J and K of a two-wire circuit are connected to the connection points C and D of the balancing bridge circuit. Based on the principle of the balancing bridge, signals of the transmitting terminals E and F of the four-wire circuit are transmitted to the transmitting and receiving terminals J and K of the two-wire circuit through the balancing bridge circuit and signals of the transmitting and receiving terminals J and K of the two-wire circuit are transmitted to the receiving terminals G and H of the four-wire circuit through the balancing bridge circuit. On the other hand, the signals of the transmitting terminals E and F of the four-wire circuit are cancelled by the bridge circuit and these signals are not transmitted to the receiving terminals G and H of the four-wire circuit. Thus, the four-wire to two-wire conversion of the channel can be realized.

However, when this hybrid circuit is applied to a MODEM, minus side terminals F and H of the four-wire circuit are usually dropped to a common ground terminal. Therefore, if the section between the bridge circuit and the four-wire circuit is not being isolated, the section between the connection points C and D and the section between the transmitting and receiving terminals J and K are short-circuited, so that this hybrid circuit does not function as the hybrid circuit.

According to the present invention, however, a current detector using an optically coupled device (such as a photo-coupler, for example) or a Hall device, and a device like an isolation amplifier have a provision of an electrical isolation in the units connected to the primary and secondary sides of these devices, and these devices make it possible to transmit data from a unit connected to the primary side to a unit connected to the secondary side. Accordingly, when these devices are utilized for an isolation between the four-wire circuit and the two-wire circuit of the hybrid circuit and for an isolation between the transmitting terminals and the receiving terminals of the four-wire circuit, the hybrid circuit can exhibit its normal function as the hybrid circuit even if the minus side terminals F and H of the four-wire circuit are dropped to the common ground terminal.

When common-mode noise (that is, noise of the same phase and same potential for the potential of the terminal J and the potential of the terminal K to the ground) has reached the transmitting and receiving terminals J and K of the two-wire circuit, the potential of the connection point D and the potential of the connection point C are the same and the potential of the connection point D and the potential of the connection point B are the same, so that no noise occurs in the section between the receiving terminals G and H. Since no operational amplifier or the like is used in this case, it is possible to achieve a hybrid circuit which can obtain receiving signals from which common-mode noise has been removed throughout the whole frequency band including the case where a common-mode noise frequency is high.

Further, according to the photo-coupler compensation circuit relating to the present invention, even if there is a variation in the current transmission rate CTR of the photo-coupler, almost an equal current transmission rate CTR is applied to the AC current and the DC current of the drive current of the light emitting device because the current transmission rate CTR is almost equal for the AC current and the DC current of the output current of the light receiving device. Accordingly, when the AC current of the output current of the light receiving device is divided by the DC current, the AC voltage (after operating the output current of the light receiving device by the compensation circuit) is determined independent of the current transmission rate CTR of the photo-coupler, so that the AC voltage is not affected by variations or fluctuations.

Further, the output DC voltage obtained between the source and the drain of the FET is equal to the voltage which is obtained by applying the current transmission rate CTR of the photo-coupler to the DC current of the drive current of the light emitting device. When this output DC voltage is made equal to the reference voltage of the integrator by the servo, the output AC voltage obtained between the source and the drain of the FET is always equal to the voltage when the output DC voltage obtained between the source and the drain of the FET is equal to the reference voltage of the integrator. When the AC to DC ratio of the current which flows through the photo-coupler is constant, the output AC current is not affected by the variations or fluctuations of the current transmission rate CTR of the photocoupler either.

Further, when the photo-coupler equipped with the compensation circuit is used in the MODEM as described above, a stable maximum transmission power can be set.

Further, according to the line interface unit relating to the present invention, loss factors due to a DC resistance can be eliminated by connecting one of the signal lines of the two-wire circuit to the output signal line of the transmitting portion, and an impedance matching can be taken by connecting the signal line to one of terminals of the impedance matching device through the receiving device. Further, loss factors of the parallel resistance can also be eliminated when a unit is provided which supplies a signal that is in the same phase and has the same amplitude with the transmission signal to be supplied to the one terminal of the impedance matching device, to the other terminal of the impedance matching device from the transmitting portion through the receiving portion at the transmission time and also when a flow of the transmission signal to the receiving portion and the impedance matching device is interrupted at the transmission time.

Accordingly, based on the combination of the above-described operations, loss of power in the impedance matching resistor can be prevented and a power-saving MODEM can be structured.

BRIEF DESCRIPTION OF THE DRAWINGS

FIG. 37 is an alternative to FIG. 1.

DESCRIPTION OF THE PREFERRED EMBODIMENTS

Figure 1:
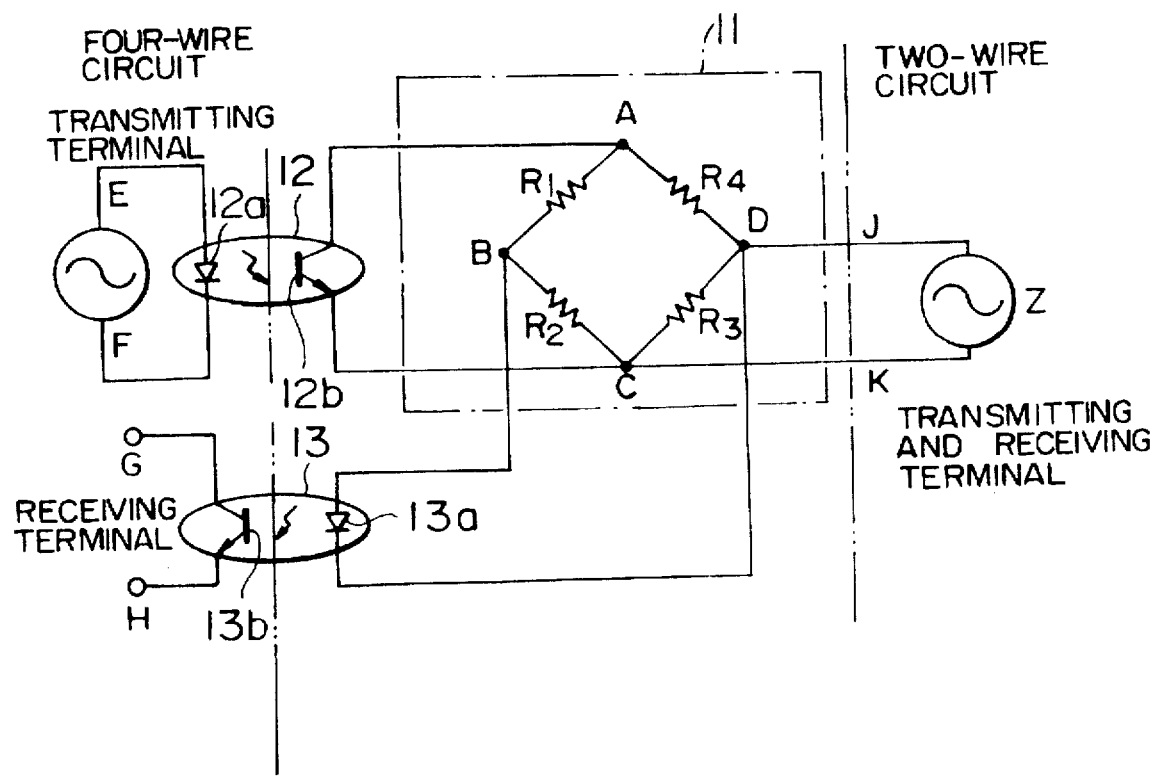
FIG. 1 is a circuit diagram of the hybrid circuit relating to a first embodiment of the present invention.

Embodiments of the present invention will be explained below with reference to the drawings.
First Embodiment FIG. 1 shows a configuration of the hybrid circuit relating to a first embodiment of the present invention. According to the hybrid circuit of the present embodiment, as shown in FIG. 1, a balancing bridge circuit 11, including four fixed resistors $R_1$, $R_2$, $R_3$ and $R_4$, is provided between a four-wire circuit and a two-wire circuit. One of the four resistors may by a wide impedance. Connection points A and C at diagonal positions (balancing points) of the balancing bridge circuit 11 and transmitting terminals E and F of the four-wire circuit are isolated by a first photo-coupler 12. Connection points B and D at the other diagonal positions (balancing points) of the balancing bridge circuit 11 and receiving terminals G and H of the four-wire circuit are isolated by a second photo-coupler 13. Transmitting and receiving terminals J and K of the two-wire circuit are connected to the connection points C and D at the adjacent positions of the balancing bridge circuit 11. The first photo-coupler 12 includes a light emitting diode 12a and a photo-transistor 12b for receiving a light from the light emitting diode 12a, and the second photo-coupler 13 includes a light emitting diode 13a and a photo-transistor 13b for receiving a light from the light emitting diode 13a.

The operation of the hybrid circuit relating to the first embodiment of the present invention will be explained.

According to the hybrid circuit of the present embodiment, when a signal has been applied between the transmitting terminals E and F of the four-wire circuit, an optical signal corresponding to the transmitted signal is transmitted from the light emitting diode 12a and an electromotive force signal corresponding to the optical signal is outputted from the photo-transistor 12b. This signal is then applied to connection points A and C of the balancing bridge circuit 11.

The voltage between the connection points C and D of the balancing bridge circuit 11 is almost equal to the voltage applied to the connection points A and C divided by the specific resistance of the bridge. Therefore, the signal applied between the transmitting terminals E and F of the four-wire circuit is transmitted to the transmitting and receiving terminals J and K of the two-wire circuit. However, since the connection points B and D have almost the same potential for the voltage applied between the connection points A and C, leakage of the signal applied between the transmitting terminals E and F of the four-wire circuit to the receiving terminals G and H is prohibited.

On the other hand, when a signal has been applied to the transmitting and receiving terminals J and K of the two-wire circuit, a potential difference occurs between the connection points B and D, because the potential of the connection point D is equal to the potential of the transmitting and receiving terminal J and the potential of the connection point B becomes almost equal to the potential of the transmitting and receiving terminal J divided by the specific resistance of the bridge. Accordingly, an optical signal corresponding to this potential difference is transmitted from the light emitting diode 13a and an electromotive force signal corresponding to this optical signal is outputted from the photo-transistor 13b, so that the signal applied to the transmitting and receiving terminals J and K of the two-wire circuit is transmitted to the receiving terminals G and H of the four-wire circuit.

Consider the case where common-mode noise (noise which is almost at the same level of noise potential for the terminal J and the terminal K to a ground point (not shown) and which changes common-mode) has reached the transmitting and receiving terminals J and K from the two-wire circuit. In this case, a voltage due to this noise does not occur between the terminals J and K, so that this common-mode noise does not occur between the ground points B and D where a partial voltage value of the voltage between the terminals J and K occurs. As a result, a hybrid circuit which is strong against common-mode noise can be obtained in a simple circuit.

Figure 14:
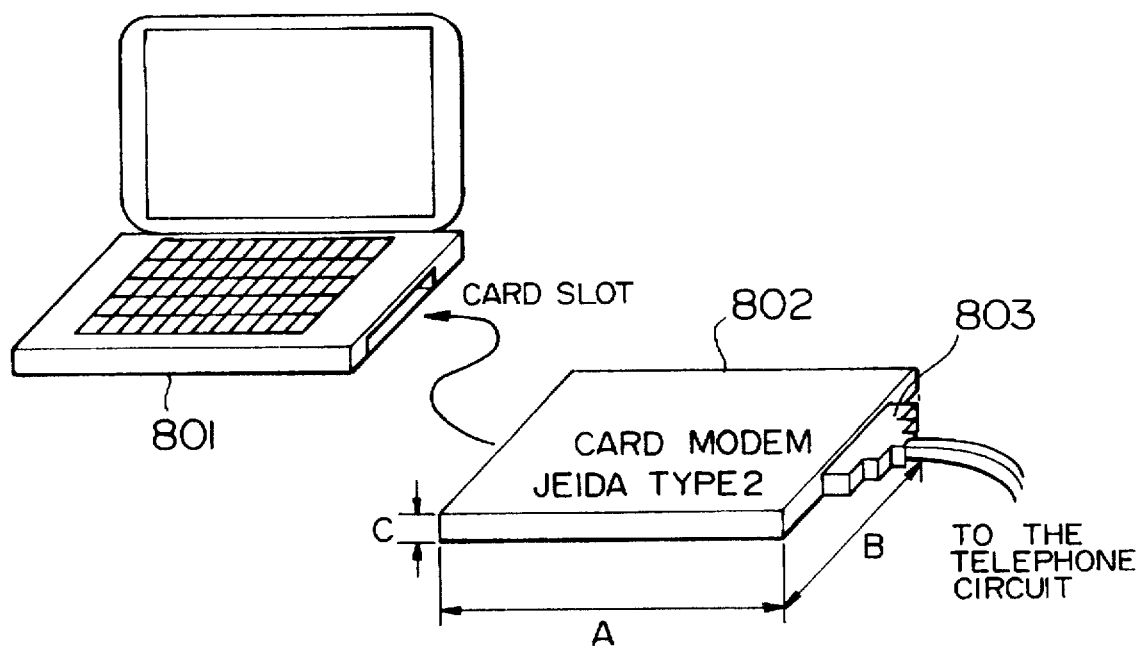
FIG. 14 is a diagram for showing the schematic view of the MODEM of the present invention.

As explained above, the hybrid circuit of the present embodiment is characterized in that the balancing bridge 11 is provided between the four-wire circuit and the two-wire circuit and that the photo-couplers 12 and 13 are provided between the transmitting terminals E and F of the four-wire circuit and the connection points A and C of the balancing bridge 11 and between the receiving terminals G and H of the four-wire circuit and the connection points B and D of the balancing bridge 11 respectively. In this structure, it is possible to omit an operational amplifier which has been essential according to the hybrid circuit which uses the conventional balancing bridge. Thus, by employing an extremely simple structure using only the balancing bridge 11 and the photo-couplers 12 and 13, it is possible to achieve a four-wire to two-wire conversion of a channel, according to which: the hybrid function is not lost by the balancing bridge; a signal is not leaked from the transmitting terminals E and F of the four-wire circuit to the receiving terminals G and H; and common-mode noise which reaches from the two-wire circuit to the transmitting and receiving terminals J and K does not occur in the receiving terminals G and H, even if the transmitting terminal F and the receiving terminal H of the four-wire circuit are dropped to a common ground terminal. In this case, since no operational amplifier is used, it is possible to effectively remove common-mode noise from the whole frequency band, including noise of the high frequency band outside the operational amplifier band that has not been able to be removed by the conventional unit using the operational amplifier. Thickness of the photo-couplers used in the above embodiment is about 2 mm. This embodiment has a feature that the balancing bridge, the secondary side of the transmitting opto-coupler and the primary side of the receiving opto-coupler which are connected to the 2-wire circuit demand only the D.C. current in the 2-wire circuit, necessitating no external power supply and convenient for MODEM. FIG. 14 shows an embodiment of the communication unit using a card type MODEM including a hybrid circuit of the present invention. In FIG. 14, 801 designates a personal computer, 802 a card type MODEM and 803 a connector. The card MODEM 802 includes a digital unit and a PCMCIA interface in addition to the analog unit including a hybrid circuit of the embodiment (refer to FIG. 11). The MODEM 802 can be structured in a very thin type as shown in FIG. 14. The thickness of the photo-coupler to be used for the MODEM 802 is about 2 mm, so that the thickness of the MODEM itself can also be set to about 2 to 3 mm, resulting in a very thin structure, where A=85.6 mm and B=54.0 mm.

Other circuits explained with the following embodiments 2 to 9 may be applied in the card type MODEM 802.

Second embodiment

Figure 2:
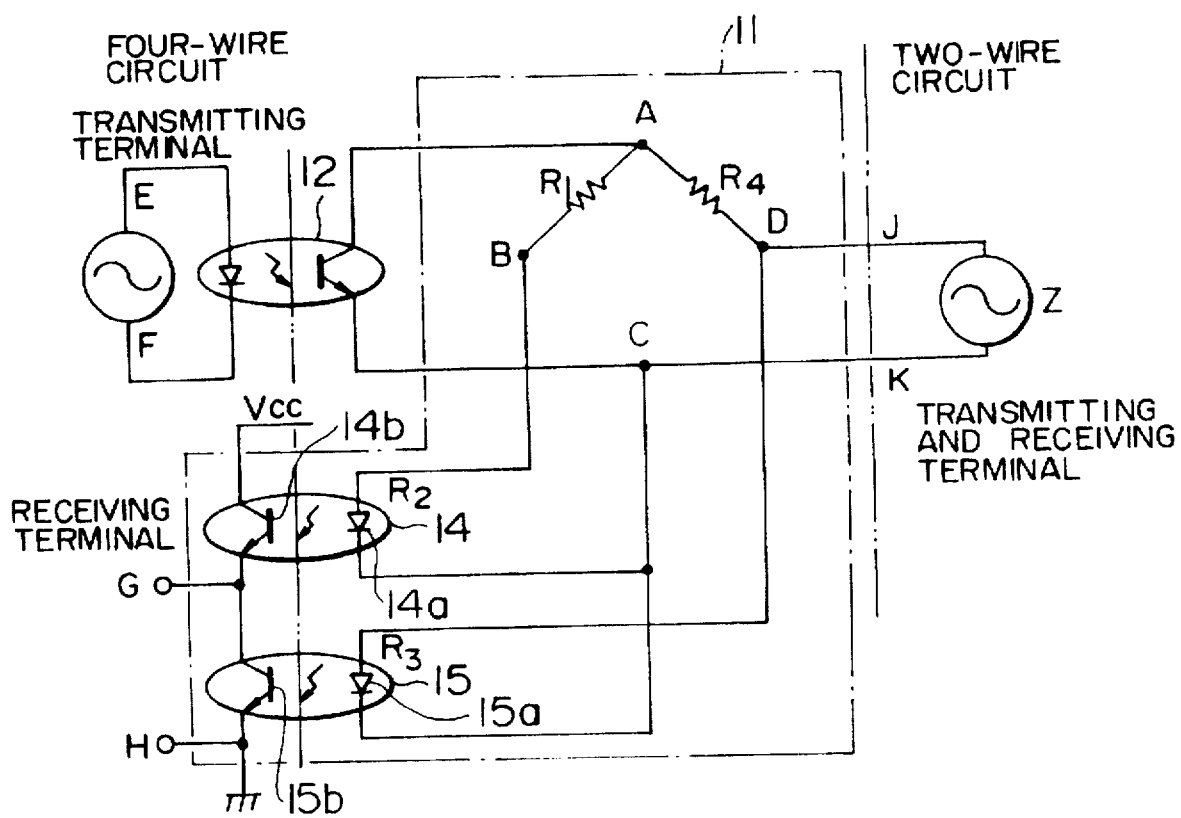
FIG. 2 is a circuit diagram of the hybrid circuit relating to a second embodiment of the present invention.

FIG. 2 shows a configuration of the hybrid circuit relating to a second embodiment of the present invention. The hybrid circuit of the present embodiment is characterized in that, as shown in FIG. 2, of the devices which structure the balancing bridge circuit 11, devices connected between the connection points B and C and devices connected between the connection points C and D are substituted by third and fourth photo-couplers 14 and 15 which prevent the leakage of signals from the transmitting terminals E and F of the four-wire circuit to the receiving terminals G and H.

The operation of the hybrid circuit relating to the second embodiment will be explained below.

When a signal has been applied between the transmitting terminals E and F of the four-wire circuit, this signal is added to the connection points A and C of the balancing bridge circuit 11 through the first photo-coupler 12 in a similar manner as described above.

The voltage between the connection points C and D of the balancing bridge circuit 11 becomes almost equal to the voltage applied to the connection points A and C divided by resistances R1 and R4 of the bridge and primary impedances of the photo-couplers 14 and 15. Therefore, the signal applied between the transmitting terminals E and F of the four-wire circuit is transmitted to the transmitting and receiving terminals J and K of the two-wire circuit. However, almost an equal current flows through the third and fourth photo-couplers 14 and 15 against the voltage applied to the connection points A and C, so that a feed-through current according to the signal flows between voltage sources $V_{CC}$ and GND in the receiving circuit and there is no variation in the potential of the terminal G which is connected to an intermediate point between the $V_{CC}$ and GND. Therefore, a leakage of the signal applied between the transmitting terminals E and F of the four-wire circuit to the receiving terminals G and H can be prevented.

On the other hand, when a signal has been applied to the transmitting and receiving terminals J and K of the two-wire circuit, a potential difference occurs between the connection points B and D, because the potential of the connection point D is equal to the potential of the transmitting and receiving terminal J and the potential of the connection point B becomes almost equal to the potential of the transmitting and receiving terminal J divided by the resistances $R_1$ and $R_4$ of the bridge and the primary impedances of the photo-couplers 14 and 15. Accordingly, an optical signal corresponding to this potential difference is transmitted from the light emitting diodes 14a and 15a and an electromotive force signal corresponding to this optical signal is outputted from the photo-transistors 14b and 15b, so that the signal applied to the transmitting and receiving terminals J and K of the two-wire circuit is transmitted to the receiving terminals G and H of the four-wire circuit.

The hybrid circuit of the present embodiment also has a similar effect to the effect of the hybrid circuit relating to the first embodiment.

Third embodiment

Figure 3:
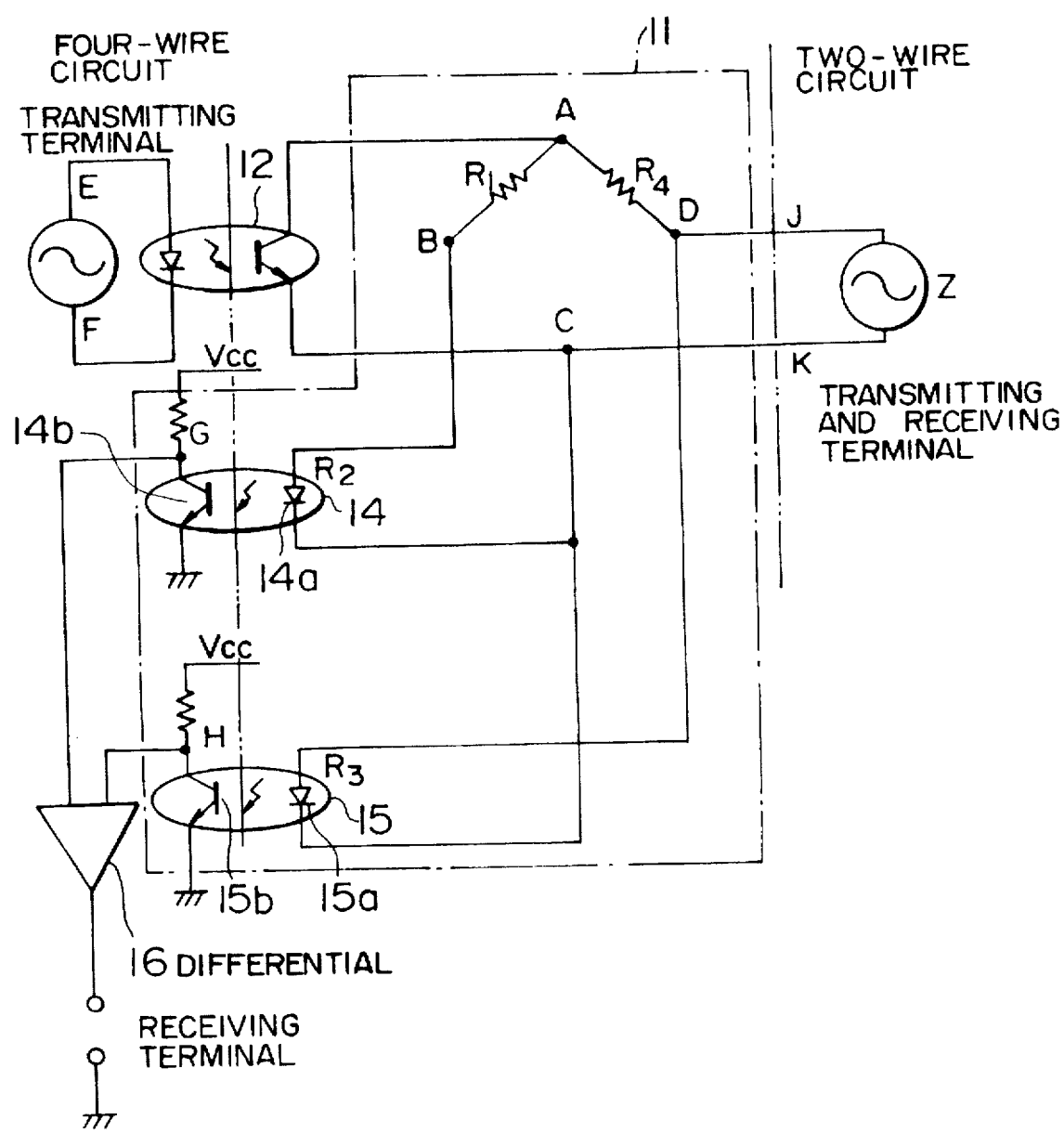
FIG. 3 is a circuit diagram of the hybrid circuit relating to a third embodiment of the present invention.

FIG. 3 shows a configuration of the hybrid circuit relating to a third embodiment of the present invention. The hybrid circuit of the present embodiment is characterized in that outputs of the secondary side photo-couplers 14b and 15b of the two photo-couplers 14 and 15 of the same characteristics connected to the receiving terminals G and H of the four-wire circuit are differentially amplified by a differential amplifier 16. Other portions have the structure similar to the structure of the second embodiment.

According to the hybrid circuit of the present embodiment, when a signal has been applied to the connection points A and C of the balancing bridge circuit 11, almost an equal level of current flows through the third and fourth photo-couplers 14 and 15. Therefore, the potential of the input terminals G and H of the differential amplifier 16 becomes almost equal, with a result that a leakage of the signal applied between the transmitting terminals E and F of the four-wire circuit to the receiving terminals G and H can be prevented. Transmission of a signal from the transmitting terminals E and F of the four-wire circuit to the two-wire circuit and transmission of a signal from the two-wire circuit to the receiving terminals of the four-wire circuit are carried out in the same manner as that of the hybrid circuit of the second embodiment, and therefore, their explanation will be omitted.

According to the hybrid circuit of the present embodiment, there is an effect similar to the effect obtained by the hybrid circuit relating to the first and second embodiments. Furthermore, there is an additional effect that a larger gain can be obtained by the receiving terminals of the four-wire circuit because the secondary side outputs of the photo-couplers 14 and 15 are differentially amplified by the differential amplifier 16 and then applied to the receiving terminals of the four-wire circuit.

Fourth embodiment

Figure 4:
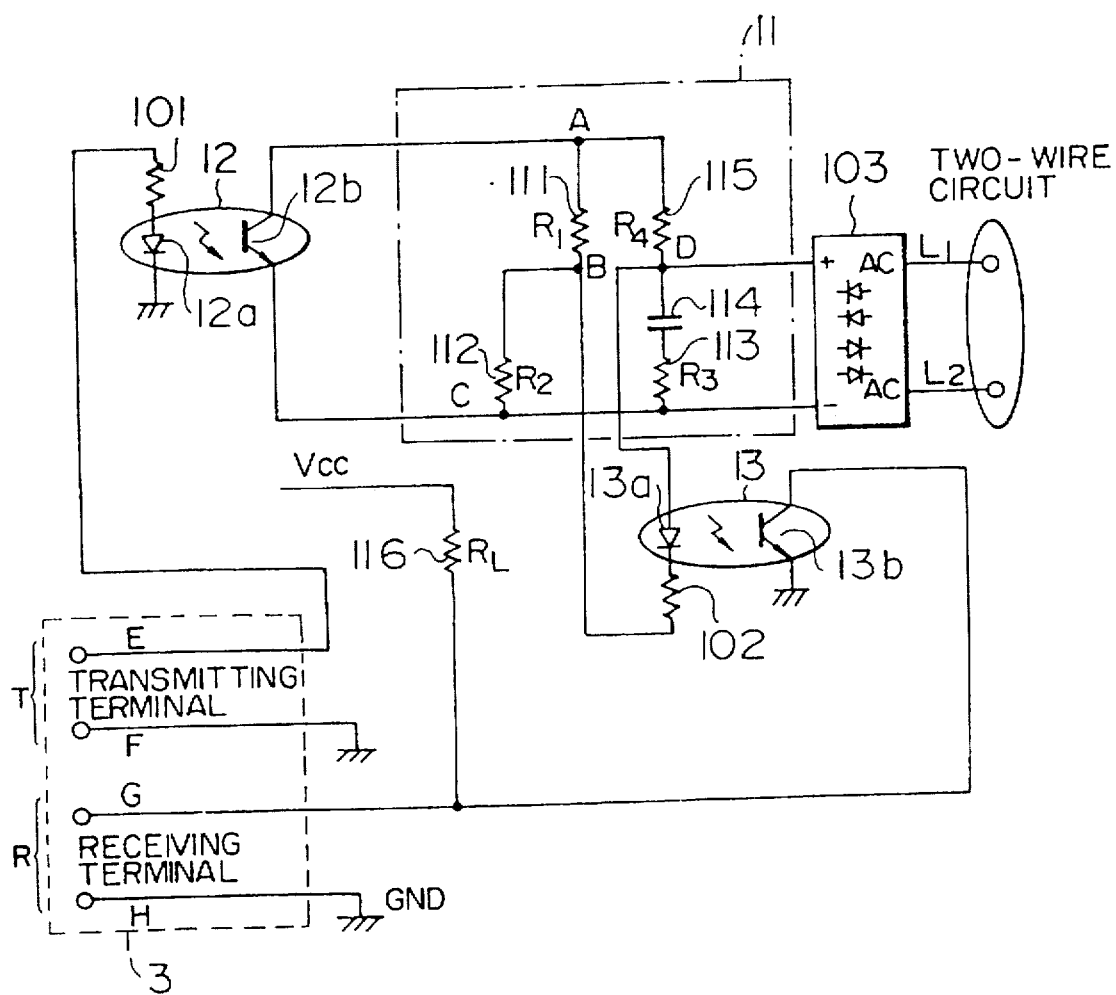
FIG. 4 is a circuit diagram of the MODEM relating to a fourth embodiment of the present invention.

FIG. 4 shows a fourth embodiment of the present invention. The fourth embodiment to a seventh embodiment are embodiments where the hybrid circuit of the present invention is applied to a MODEM.

In FIG. 4, T designates an analog signal transmitting terminal of a digital signal processing circuit 3, R designate an analog signal receiving terminal of the MODEM, and $L_1$ and $L_2$ designate a two-wire circuit of a telephone circuit. Symbols 101 and 102 designate resistors provided at the primary side of the photo-couplers 12 and 13, and 103 designate a diode bridge for keeping constant the polarity of a DC voltage applied to the photo-couplers 12 and 13 regardless of the polarity of a DC voltage applied to the two-wire circuits $L_1$ and $L_2$. As is clear from this diagram, the minus side terminals of the digital signal processing terminals T and R are dropped to a common ground terminal.

In the present embodiment, the balancing bridge circuit 11 for adding the hybrid function is structured by a resistor 111 (resistance value $R_1$), a resistor 112 (resistance value $R_2$), an impedance (a combined impedance $R_3$) of a resistor 113, a capacitor 114 and the two-wire circuits $L_1$ and $L_2$, and a resistor 115 (resistance value $R_4$). The secondary side 12b of the first photo-coupler 12 is connected between the connection points A and C of the balancing bridge circuit 11 and the primary side 13a of the second photo-coupler 13 is connected between the connection points B and D to secure an isolation between the terminals.

The principle of the operation of the MODEM of the present embodiment is similar to that of the hybrid circuit relating to the first embodiment, and therefore, its explanation will be omitted to avoid a duplication. According to the MODEM of the present embodiment, it is possible to prevent a leakage of the signal from the transmitting terminal T of the digital signal processing circuit to the receiving terminal R.

Fifth embodiment

Figure 5:
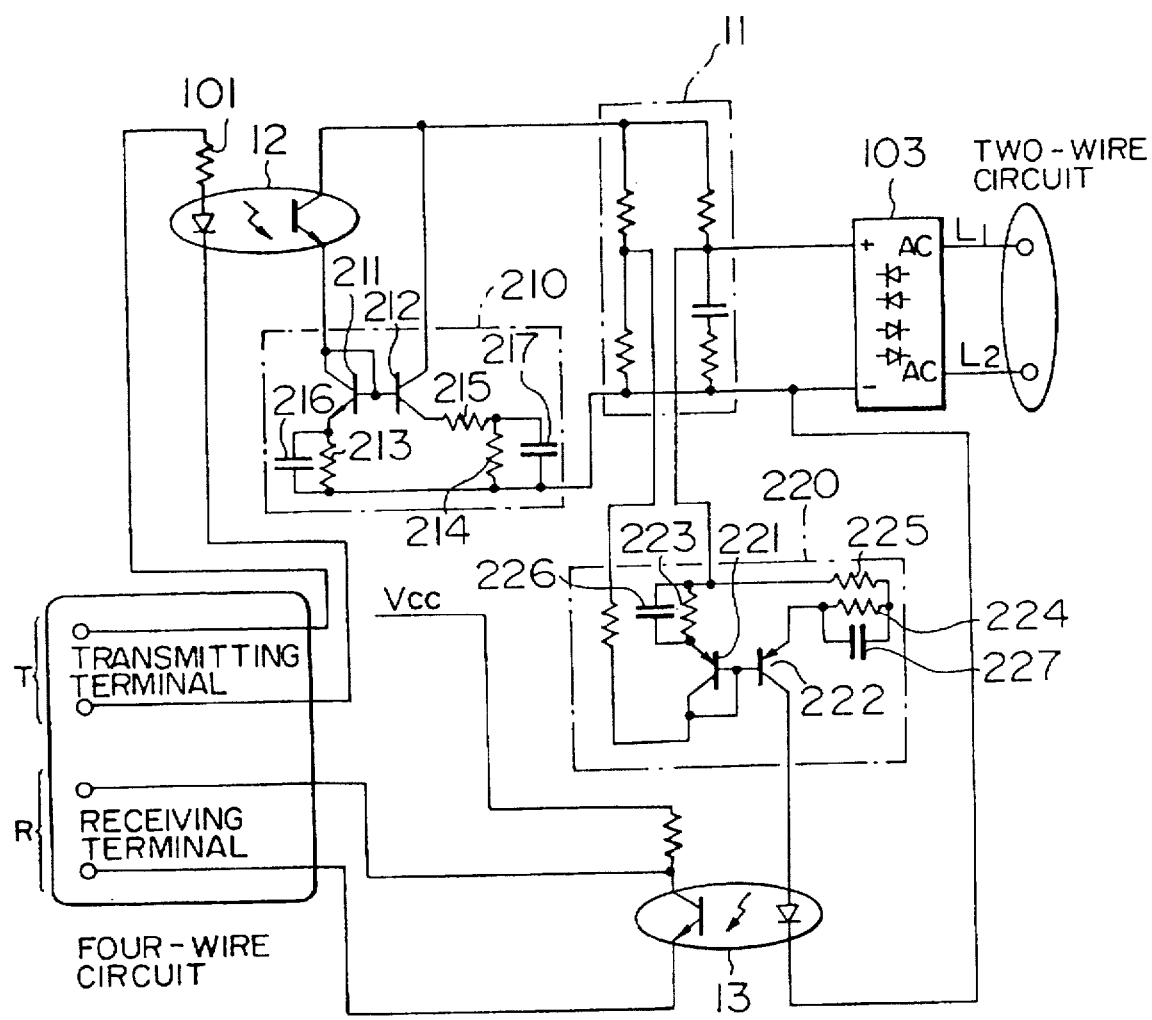
FIG. 5 is a circuit diagram of the MODEM relating to a fifth embodiment of the present invention.

FIG. 5 shows a fifth embodiment of the present invention. Taking into consideration the fact that commercially available photo-couplers are not always sufficient enough in their transmission efficiency and allowable current, the MODEM of the present embodiment is characterized in that current amplifier circuits according to transistors have been added to the MODEM to compensate for these insufficient transmission efficiency and allowable current. In FIG. 5, symbols 210 and 220 designate current mirror circuits which are current amplifier circuits, and other portions corresponding to the same portions in FIG. 4 are designated by the same symbols.

The first current mirror circuit 210 is used for amplifying an output current of the first photo-coupler 12 connected to the transmitting terminal T of the four-wire circuit, and includes two transistors 211 and 212, three resistors 213, 214 and 215, and two capacitors 216 and 217 connected in parallel with resistors 213 and 214. The output current of the photo-coupler 12 is amplified at a scale factor according to a ratio of a combined impedance of the resistor 213 and the capacitor 216 and a combined impedance of the resistor 214 and the capacitor 217.

The second current mirror circuit 220 is used for amplifying an input current of the second photo-coupler 13 connected to the receiving terminal R of the four-wire circuit, and includes two transistors 221 and 222, three resistors 223, 224 and 225, and two capacitors 226 and 227 connected in parallel with resistors 223 and 224. The input current of the photo-coupler 13 is amplified at a scale factor according to a ratio of a combined impedance of the resistor 223 and the capacitor 226 and a combined impedance of the resistor 224 and the capacitor 227.

The principle of the operation of the MODEM of the present embodiment is the same as that of the hybrid circuit relating to the first embodiment, and therefore, its explanation will be omitted to avoid a duplication. According to the MODEM of the present embodiment, it is possible to have an effect similar to the effect of the MODEM of the fourth embodiment, and it is also possible to have sufficient transmission efficiency with an effect of a stabilized transmission of a signal because the current amplifiers have been provided at the secondary side of the first photo-coupler 12 and the primary side of the second photo-coupler 13 respectively. Although current mirrors have been used as the current amplifier circuits in the present embodiment, it is needless to mention that other current amplifier circuits can also be used on their behalf.

Sixth embodiment

Figure 6:
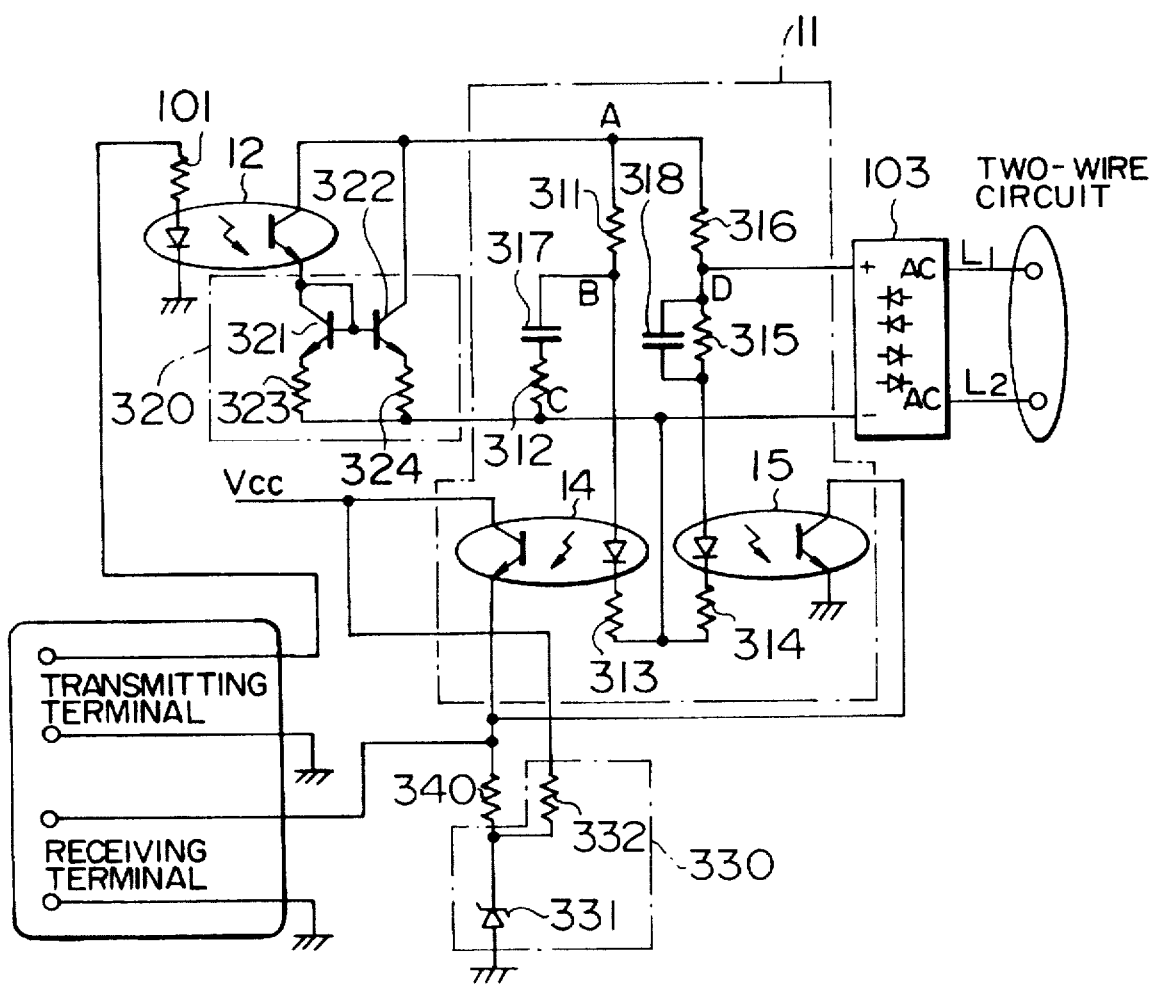
FIG. 6 is a circuit diagram of the MODEM relating to a sixth embodiment of the present invention.

FIG. 6 shows a sixth embodiment of the present invention. The MODEM of the present embodiment is characterized in that the hybrid circuit of the second embodiment has been applied. In FIG. 6, symbol 320 designates a current mirror circuit which is a current amplifier circuit, 330 a reference voltage source, and 340 a resistor, and portions corresponding to the same portions in FIGS. 2 and 4 are designated by the same symbols.

In the present embodiment, the balancing bridge circuit 11 includes a resistor 311 connected between the connection points A and B, resistors 312 and 313, a capacitor 317 and the primary side impedance of the third photo-coupler 14 connected between the connection points B and C, resistors 314 and 315, a capacitor 318 and the primary side impedance of the fourth photo-coupler connected between the connection points C and D, and a resistor 316 connected between the connection points D and A. When the resistance values of the resistors 311 to 316 are $R_1$ to $R_6$, it is possible to balance the bridge if the electrostatic capacity of the capacitors 317 and 318 is set to have sufficiently low impedance in the working frequency band by setting such that $R_1=R_6$, $R_5=R_1+R_6$, $R_5=R_4$, and $R_2$=the circuit impedance (the impedance of the two-wire circuit observed from the balancing bridge circuit 11). The secondary side of the first photo-coupler 12 is connected between the connection points A and C of the balancing bridge circuit 11, the primary side of the third photo-coupler 14 is connected between the connection points B and C, and the primary side of the fourth photo-coupler 15 is connected between the connection points C and D, to isolate between the terminals.

The current mirror circuit 320 is used to amplify the output current of the photo-coupler 12 connected to the transmitting terminal T of the four-wire circuit 320, and includes two transistors 321 and 322 and two resistors 323 and 324. The output current of the photo-coupler 12 is amplified at a scale factor according to the resistor 323 and the resistor 324.

The reference voltage source 330 is structured by a Zener diode 331 and a resistor 332, and is connected to the secondary side of the photo-coupler 14 through the resistor 340.

The operation of the MODEM of the present embodiment will be explained below.

A signal applied to the transmitting terminal T of the four-wire circuit is transmitted between the connection points A and C of the balancing bridge circuit 11 through the resistor 101, the photo-coupler 12 and the current mirror circuit 320. When the impedance between the connection points C and D is $R_{CD}$ and the impedance between the connection points D and A is $R_{DA}$, this signal is transmitted to the terminals $L_1$ and $L_2$ of the two-wire circuit by being multiplied by a factor of about $R_{CD}/(R_{DA}+R_{CD})$.

On the other hand, the signal applied to the terminals $L_1$ and $L_2$ is directly transmitted between the connection points C and D of the balancing bridge circuit 11. When the impedance between the connection points B and C is $R_{BC}$, the impedance between the connection points A and B is $R_{AB}$, and the impedance between the connection points D and A is $R_{DA}$, the signal transmitted between the connection points C and D is transmitted between the connection points B and C by being multiplied by a factor of about $R_{BC}/(R_{AB}+R_{DA}+R_{BC})$. Therefore, when the signal currents which flow to the secondary side of the photo-couplers 15 and 14 are $I_1$ and $I_2$ respectively, a relation of $I_1$: $I_2$=1: $\{R_{BC}/(R_{AB}+R_{DA}+R_{BC})\}$ is established, and when $I_1$ is not equal to $I_2$, a differential component of the signal current flows to the resistor 340 and a signal voltage of $|I_1-I_2|\times R_{340}$ is transmitted to the receiving terminal R of the four-wire circuit based on the reference voltage.

Since $I_1$ and $I_2$ become equal for the signal applied to the transmitting terminal T of the four-wire circuit, the currents flowing through the photo-couplers 14 and 15 pass through the $V_{CC}$ to the earth. Accordingly, the signal current does not flow through the resistor 340, so that no signal is transmitted to the receiving terminal R of the four-wire circuit.

The MODEM of the present embodiment also has an effect similar to the effect of the MODEM in the fifth embodiment.

Seventh embodiment

Figure 7:
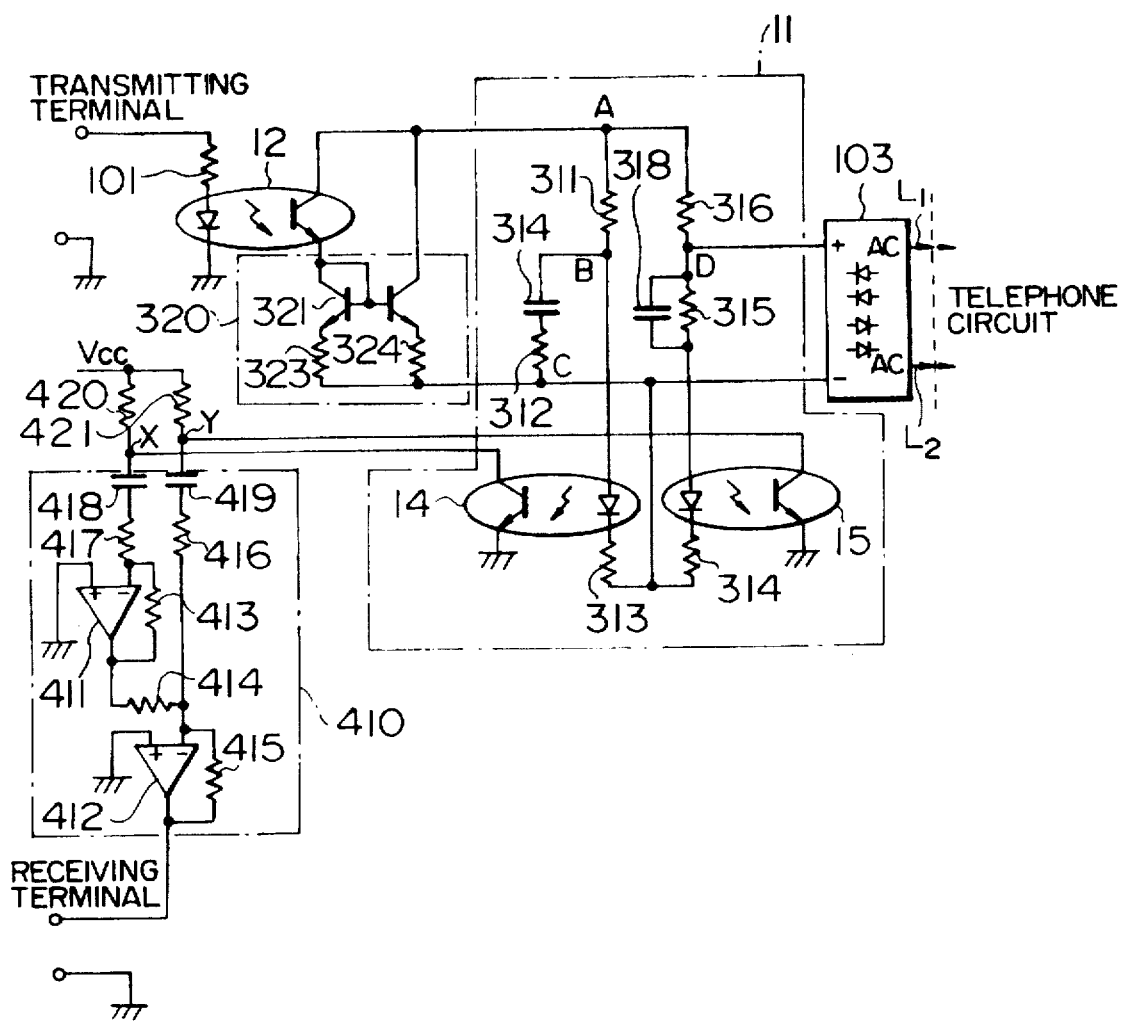
FIG. 7 is a circuit diagram of the MODEM relating to a seventh embodiment of the present invention.

FIG. 7 shows a seventh embodiment of the present invention. The MODEM of the present embodiment is characterized in that the hybrid circuit of the third embodiment has been applied to this MODEM. In FIG. 7, symbol 410 designates a differential amplifier, and 420 and 421 designate resistors. Portions corresponding to the same portions in FIG. 6 are designated by the same symbols.

The differential amplifier 410 includes operational amplifiers 411 and 412 and resistors 413 to 417, and is used to amplify the differential component of the signal applied to the connection points X and Y. Other portions are the same as the portions of the MODEM of the sixth embodiment, and therefore their explanation will be omitted to avoid a duplication.

As explained in the sixth embodiment, a signal applied to the transmitting terminal T of the four-wire circuit is transmitted between the connection points A and C of the balancing bridge circuit 310 and is then transmitted from the connection points C and D to the terminals $L_1$ and $L_2$ of the two-wire circuit. In the mean time, a signal applied to the terminals $L_1$ and $L_2$ of the two-wire circuit is transmitted to the receiving terminal R of the four-wire circuit through the balancing bridge circuit 310. Since the currents $I_1$ and $I_2$ flowing to the connection points X and Y become almost equal for the signal applied to the transmitting terminal T of the four-wire circuit, the output of the differential amplifier 410 becomes almost zero, so that no signal is transmitted to the receiving terminal R of the four-wire circuit. Accordingly, the MODEM of the present embodiment also has an effect similar to the effect of the MODEM in the sixth embodiment.

Eighth embodiment

Figure 8A:
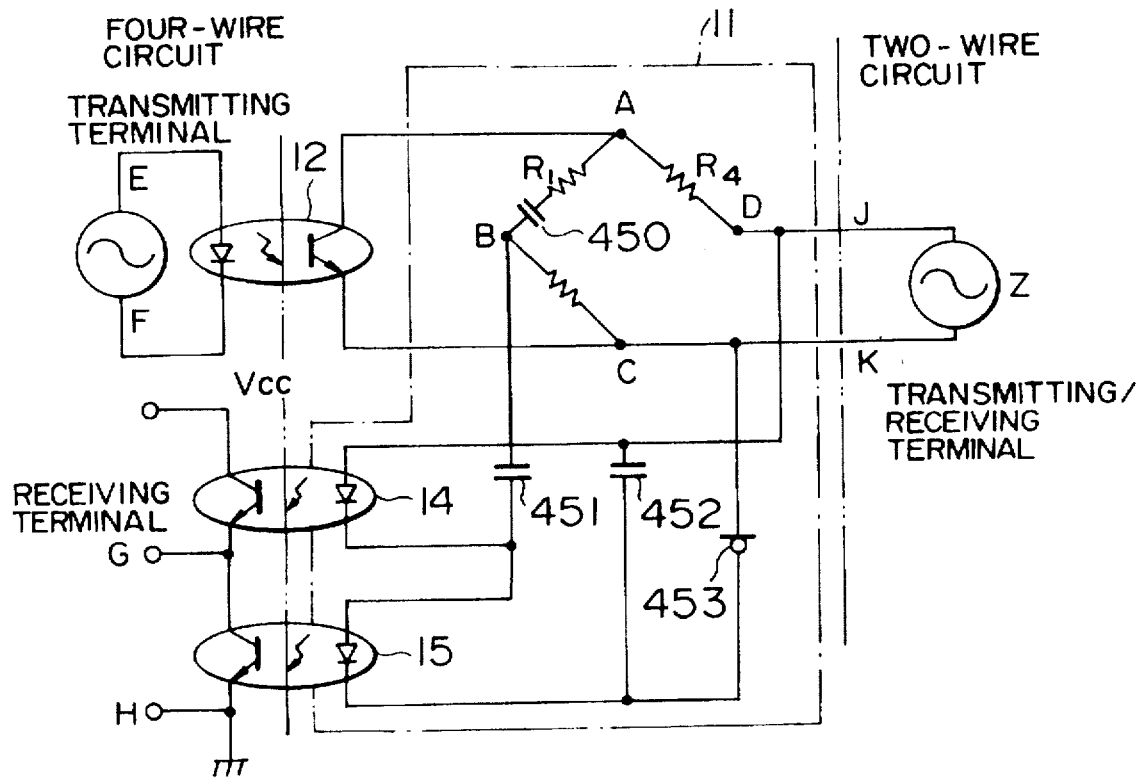
FIGS. 8A and 8B show circuit diagrams of the hybrid circuit relating to an eighth embodiment of the present invention.
Figure 8B:
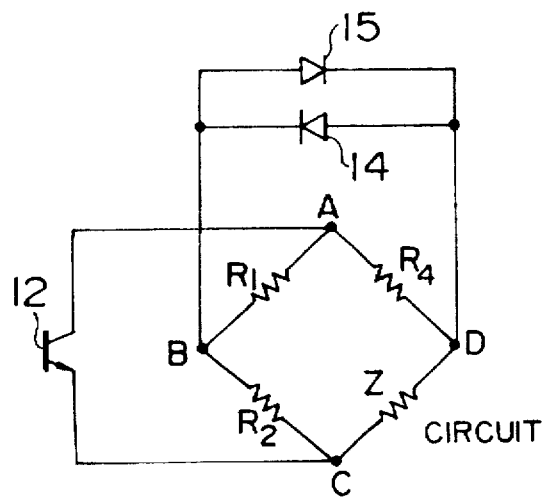

FIGS. 8A and 8B show an eighth embodiment of the present invention. In the present embodiment, two sets of the transmitting or receiving photo-couplers respectively in the hybrid circuit of the first embodiment are used to make the two respective photo-couplers to carry out a so-called push-pull operation for applying signals of an equal amplitude in opposite phases. FIG. 8A shows an actual circuit and FIG. 8B shows an equivalent circuit thereof. These diagrams show the case where the receiving photo-couplers are set in a push-pull structure. In FIG. 8, 450 to 452 designate capacitors for transmitting an AC signal and interrupting a DC, 453 a constant current diode, and Z a circuit impedance. Portions corresponding to the same portions in FIG. 1 are designated by the same symbols. For the MODEM, there is, for example, ITU-(ex CCITT)V.22 bis as a standard for carrying out 2400 bps full duplex communication. This system uses frequencies of a ratio of one to two of 1200 Hz and 2400 Hz respectively for the carrier frequencies of the calling side MODEM and the receiving side MODEM. Therefore, this system has a problem of a secondary harmonic distortion. When a push-pull operation is carried out, even harmonics are canceled out together so that a satisfactory communication can be expected.

In FIG. 8A, the photo-coupler 14 is for receiving a plus phase, the photo-coupler 15 is for receiving a minus phase and the photo-coupler 12 is for transmission, and sufficient bias current is supplied to each of these photo-couplers to make them perform a class A operation. The photo-coupler 14 and the photo-coupler 15 are connected in series and therefore a DC bias of the same value is applied as a DC to these photo-couplers. However, since the anode of the photo-coupler 14 and the cathode of the photo-coupler 15 are connected by the capacitor 452, a signal of an inverse phase is applied as an AC to these photo-couplers.

Accordingly, when an AC voltage is applied between the terminals J and K and then an AC voltage is subsequently applied between the connections D and B, the current of the photo-coupler 14 increases and the current of the photo-coupler 15 decreases when the amplitude is deflected to the plus direction, and the current of the photo-coupler 15 increases when the amplitude deflects to the minus direction.

As explained above, when a push-pull operation is carried out, even harmonic distortions are canceled out together and gain increases by 6 dB and random noise increases by only 3 dB, with a result that the S/N ratio is improved by 3 dB. The transmitting photo-coupler 12 can also remove even harmonic distortion in a similar manner in a push-pull structure.

The present embodiment can also obtain an effect similar to the effect obtained in the first embodiment.

Ninth embodiment

Figure 9:
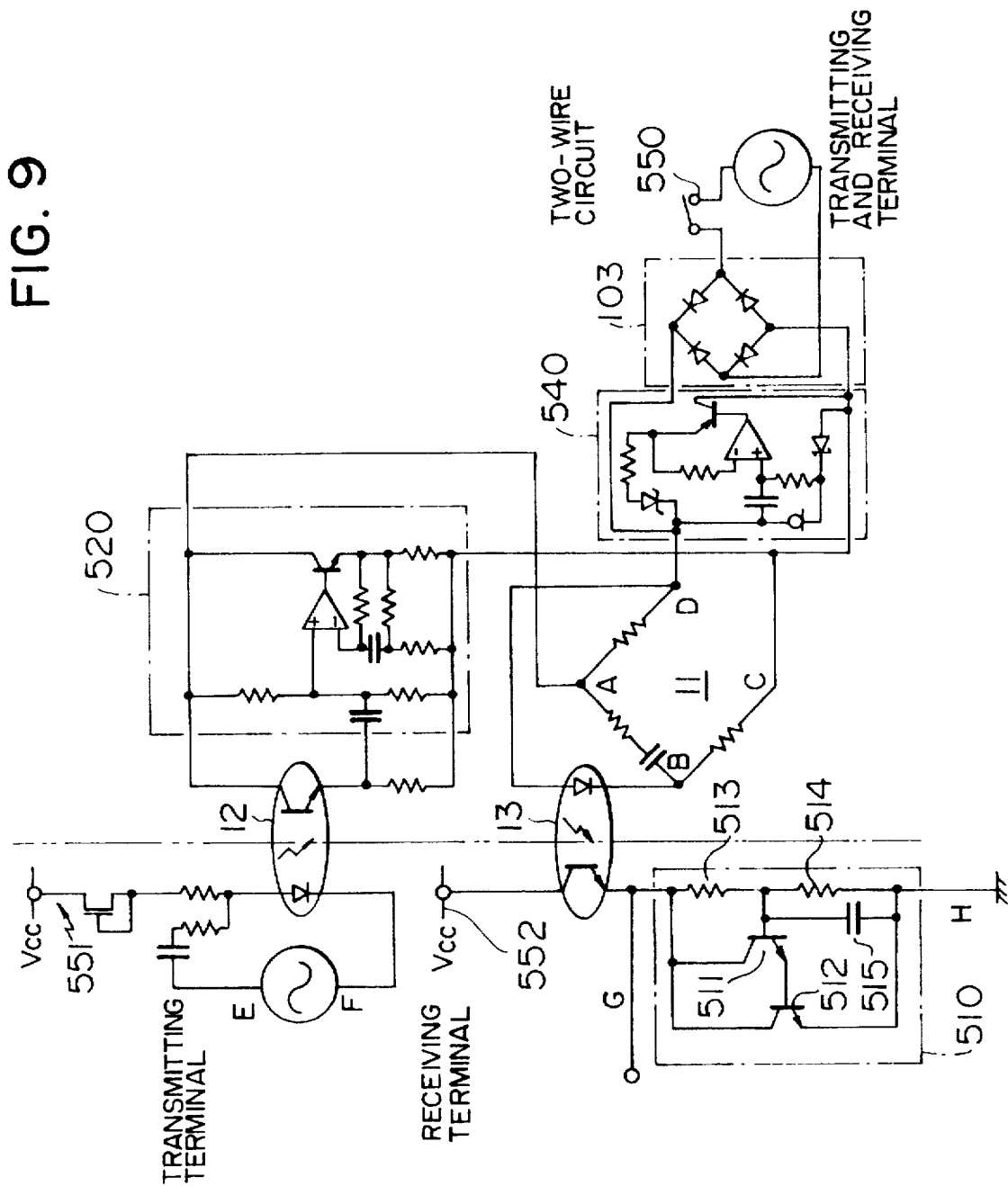
FIG. 9 is a circuit diagram of the MODEM relating to a ninth embodiment of the present invention.

FIG. 9 shows a ninth embodiment of the present invention. The present embodiment solves one of problems arising from variations in photo-coupler products in each of the preceding embodiments. This problem will be explained by referring to the embodiment shown in FIG. 4 as an example. When a photo-coupler is used, a suitable level of a DC bias current flows to the primary side of the photo-coupler. In this case, a current of the primary side bias current multiplied by a current transmission efficiency of the photo-coupler flows through the secondary side.

In the present invention, there is a case where an electronic circuit is connected to a later stage of the secondary side of the photo-coupler. Consider a case that the circuit of FIG. 4, for example, is used for an NCU (Network Control Unit) of the MODEM. In this circuit, the secondary side 13b of the photo-coupler 13 is received by the load resistor 116 having a resistance value of RL, and this is connected to an electronic circuit at a later stage by a resistance-capacitance coupling (not shown) from the terminal G.

In this circuit, product variations of the photo-coupler can easily affect the operation point of the circuit. This seriously affects a maximum allowable output voltage of the circuit. A maximum allowable output voltage of the circuit will be explained below by carrying out an operation analysis of this circuit.

In the embodiment shown in FIG. 4, a DC potential V of the secondary side output terminal G of the photo-coupler 13 is determined by $$V = V_{CC} - I_1 \times RL$$

where $V_{CC}$ represents a power source voltage, RL represents a value of the resistor 116 and $I_1$ represents a DC current flowing through the secondary side of the photo-coupler 13. As explained above, the current flowing through the secondary side of the photo-coupler is proportional to the transmission efficiency of the photo-coupler, so that the DC potential of the secondary side output terminal is also proportional to the current transmission efficiency of the photo-coupler.

A maximum allowable output voltage at the output terminal G of the photo-coupler depends on a DC potential V of the photo-coupler output terminal for the following reason. An output voltage of the photo-coupler swings in plus and minus directions around a DC potential V (usually, one half of the power source voltage $V_{CC}$) of the output terminal. When the output voltage swings in the plus direction, the output voltage is restricted by a condition that the output voltage can not exceed the power source voltage $V_{CC}$, and when the output voltage swings in the minus direction the output voltage is restricted by a condition that the output voltage can not drop below the ground potential.

In order to have a maximum allowable voltage to be as high as possible, the photo-coupler is designed such that the DC potential V of the output terminal becomes one half of the power source voltage $V_{CC}$ when the current transmission efficiency of the photo-coupler is maximum. However, when the photo-coupler has been designed as described above, if it is assumed that the current transmission efficiency of the photo-coupler fluctuates around a standard value by±6 dB, the DC potential of the output terminal becomes three quarters of the power source voltage $V_{CC}$ when the current transmission efficiency is a standard value (one half of the maximum value). In this case, a maximum allowable swing width in the plus direction becomes $V_{CC} - (\frac{3}{4}) V_{CC} = (\frac{1}{4}) V_{CC}$, so that the maximum allowable output becomes about one half of the power source voltage $V_{CC}$ for a peak-to-peak value.

As one example, when the power source voltage is 3.3 V and the secondary side DC current is 1 mA, the value of the resistor RL is as follows:

$$3.3 \div (4 \times 1 \times 10^{-3}) = 825 \, \Omega$$

The above-described problem similarly occurs when the load resistor (RL) is connected between the photo-coupler 13 and the ground point GRD and an output is taken out from both ends of the resistor 116.

When the input impedance of the electronic circuit at a later stage is sufficiently high, "current to voltage conversion efficiency" at a coupling point between the photo-coupler output terminal and the later stage electronic circuit is proportional to the value of the RL. Accordingly, if it is possible to set the value of the RL at an effectively high level, it is possible to have high "current to voltage conversion efficiency".

The ninth embodiment shown in FIG. 9 gives one solution to the above problem.

In the present embodiment, a power source circuit 510 according to an electronic circuit is connected as a load on behalf of a resistor connected to the output terminal of the photo-coupler 13 in the above example. This load power source circuit 510 includes transistors 511 and 512, resistors 513 and 514 and a by-pass capacitor 515, and is connected between the secondary side of the photo-coupler 13 and the ground. The load power source circuit 510 operates as a constant voltage circuit when a DC is applied and operates as a constant current circuit when an AC is applied. In FIG. 9, portions corresponding to the same portions in FIG. 1 are designated by the same symbols. 520 designates a circuit driver (an output driver), 540 a semiconductor inductor circuit, 550 a rectifying circuit, and 551 and 552 power sources.

The load power source circuit 510 will be explained. The transistors 511 and 512 function as by-passes of the current which flows through the photo-coupler 13, so that a DC flowing through the photo-coupler 13 and a current flowing through the load power source circuit 510 are equal. A DC potential $V_{OUT}$ at the output terminal G of the photo-coupler is obtained as follows:

$$V_{OUT} = \{(R_{513} + R_{514}) \times V_{BE} \times 2\} / R_{514} \approx V_{CC}/2$$

where $R_{514}$ designates a value of the resistor 514, $R_{513}$ designates a value of the resistor 513 and $V_{BE}$ designates a voltage between the base and the emitter per unit of the transistors 511 and 512.

In the present embodiment, a DC potential at the photo-coupler output terminal G does not change so much according to a flowing current. Therefore, if the DC potential has been set in advance to about one half of the power source voltage $V_{CC}$, it is possible to swing the output voltage to a maximum level of the power source voltage.

The above means that it is possible to take a maximum allowable output voltage of two times as a standard as compared with the above-described circuit in FIG. 4.

In the mean time, the load power source circuit 510 operates as a constant current circuit when an AC is applied. This operation will be explained below. A capacitor 515 is connected to the base terminal of the transistor 511, and the resistors 513 and 514 and the capacitor 515 form a low-pass filter. By the operation of this low-pass filter, only a signal of a frequency lower than the cut-off frequency of the filter is transmitted to the transistors 511 and 514. Accordingly, the circuit does not respond to a signal of a frequency higher than the cut-off frequency of the filter, so that the circuit continues to flow a constant current. Therefore, this circuit operates as a constant current circuit when an AC is applied.

As a result of the above operation, the impedance of this circuit becomes a serial value of the resistors 513 and 514. In other words, the value of the load resistor in an AC flow observed from the photo-coupler 13 is a serial value of the resistors 513 and 514. The serial value of the resistors 513 and 514 can be easily set to several tens $K\Omega$.

As explained above, the "current to voltage conversion efficiency" is proportional to the value of the resistors at this portion. In the present embodiment, the value of the resistor can be easily set to a value of several times as compared with the above-explained example relating to FIG. 4. Therefore, it is possible to increase the efficiency by this amount.

Although the load power source circuit 510 has been provided between the secondary side of the photocoupler 13 and the ground in the above embodiment, it is needless to mention that the similar load power circuit 510 can also be provided between the secondary side of the photo-coupler 13 and the power source $V_{CC}$, in stead of the above position. It is also possible to provide the similar load power source circuit as a secondary side load of the transmitting photo-coupler 12.

The present embodiment can also have an effect similar to the effect of the preceding embodiments.

Tenth embodiment

Figure 10:
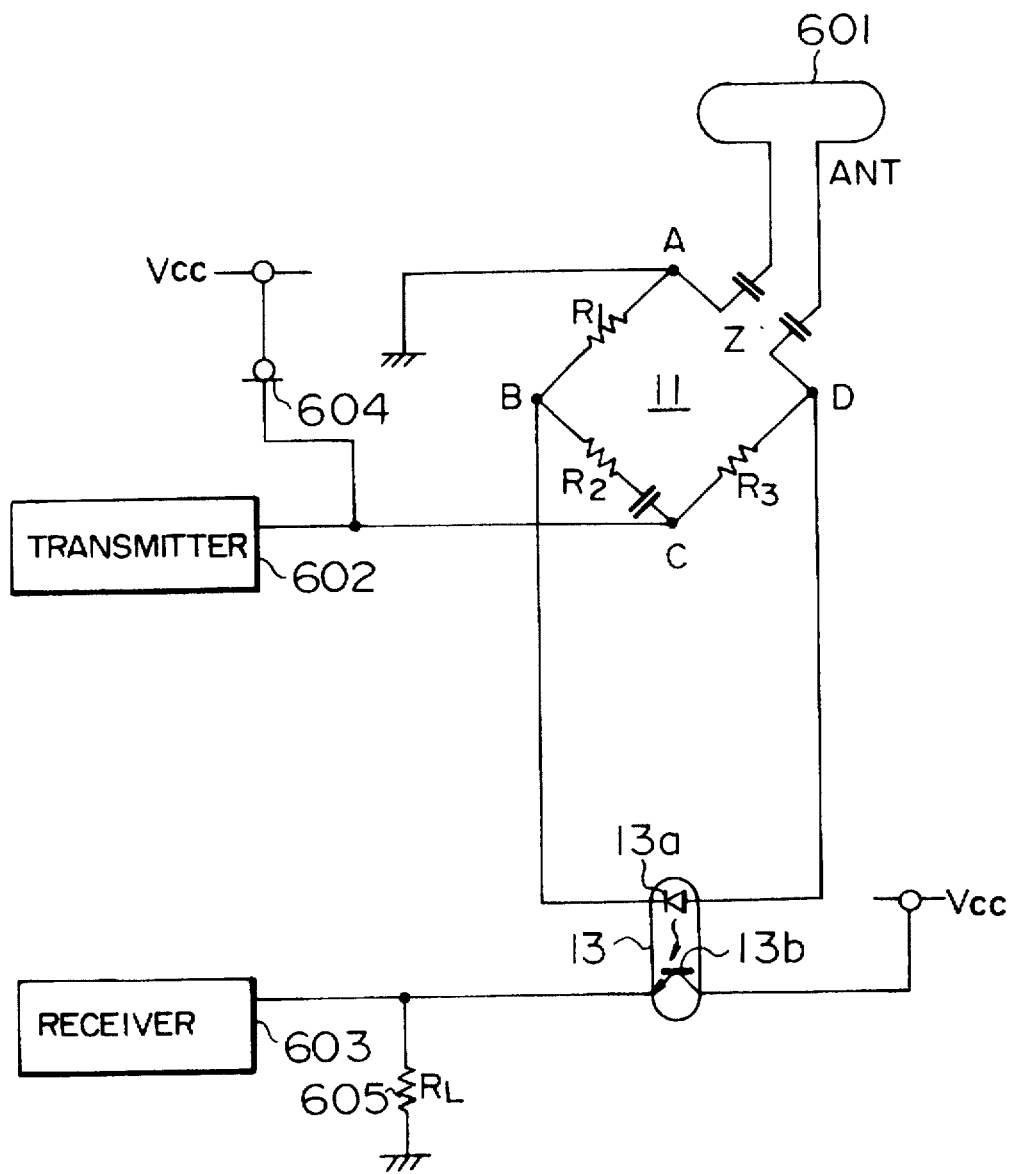
FIG. 10 is a circuit diagram of the FM transmitter and receiver relating to a tenth embodiment of the present invention.

FIG. 10 shows a tenth embodiment of the present invention. In the present embodiment, the present invention has been applied to a radio transmitter and receiver. The present embodiment is used when one antenna of a radio transmitter and receiver is commonly used for transmission and receiving.

In FIG. 10, 601 designates an antenna, 602 an FM transmitter, 603 an FM receiver, 604 a constant current diode, and 605 a load resistor (RL). Portions corresponding to the same portions in FIG. 1 are designated by the same symbols. The antenna 601 is commonly used for transmitting and receiving of signals, and forms the balancing bridge 11 of four terminals including the impedance Z and the remaining impedance devices $R_1$ to $R_3$. As is the same with the other embodiments, the receiving photo-coupler 13 is connected to the bridge 11 and a transmitting signal is separated from a receiving signal.

When the present embodiment is used for a radio communication at a relatively close distance, it is possible to set a signal level of a receiving signal to be higher than a signal level of a transmitting signal leaking to a receiving circuit due to unbalance of the bridge.

A receiver of the FM system is characterized in that it selectively receives a signal level of a wave to be as high as possible when waves of the same frequency have reached the receiver. This is called a capture effect. When the present embodiment is used by utilizing the capture effect, it becomes possible to carry out a bidirectional communication by using the same frequency for the transmitting frequency and the receiving frequency.

The present embodiment can also be applied to the case where a transmitting carrier frequency is different from a receiving carrier frequency.

According to the present embodiment, the photo-coupler is required to be provided either between the bridge and the receiver or between the bridge and the transmitter. With this arrangement, minus side of the transmitting terminals and the receiving terminals respectively can be grounded together.

Eleventh embodiment

Figure 11:
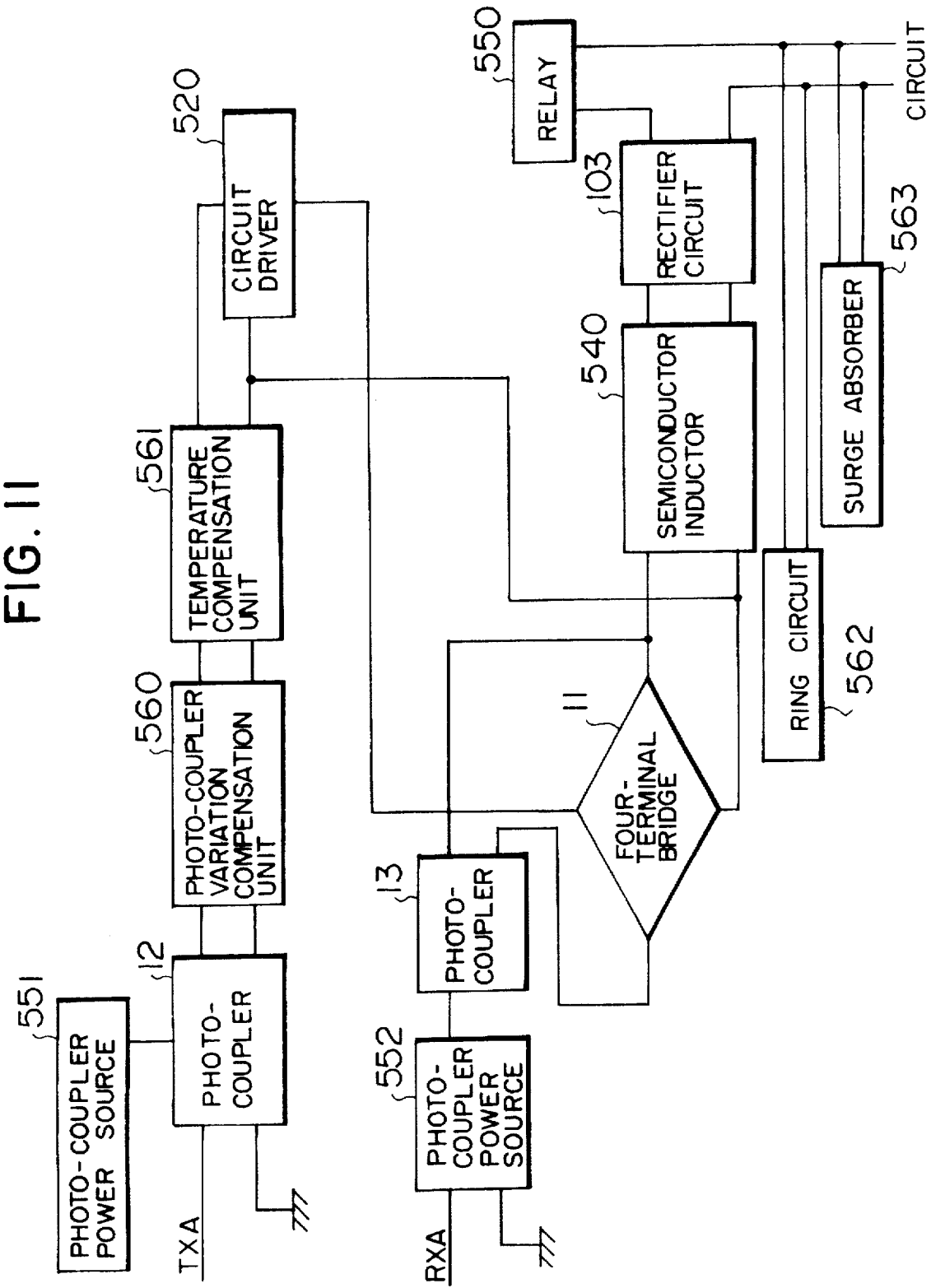
FIG. 11 is a block diagram for showing a schematic structure of the MODEM relating to an eleventh embodiment of the present invention.

FIG. 11 is a block diagram for showing a schematic configuration of the MODEM front end including the four-wire to two-wire conversion unit and the NCU of the MODEM to which the embodiment of FIG. 9 has been applied. Portions corresponding to the same portions in FIG. 9 are designated by the same symbols. However, the photo-coupler power source 555 is structured by the supply power source 552 and the load power source 510 shown in FIG. 9. In the present embodiment, a photo-coupler variation compensation circuit 560 of the transmitting portion, a temperature compensation circuit 561, a call circuit 582 and a surge absorber 563 are added to the embodiment of FIG. 9.

Twelfth embodiment

Figure 12:
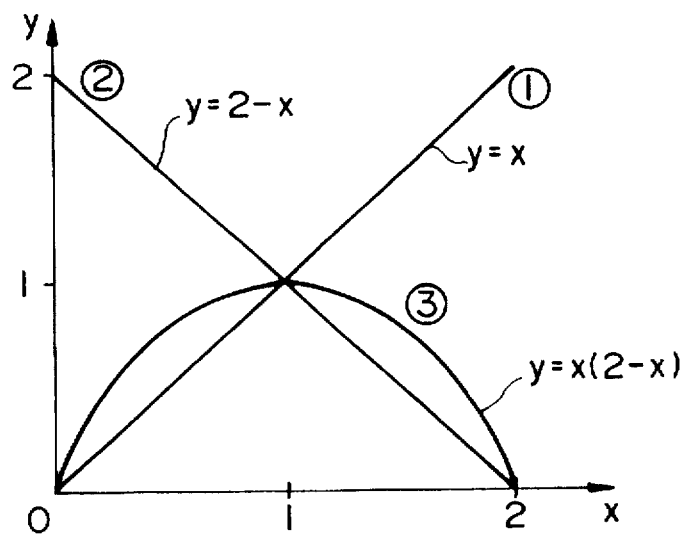
FIG. 12 is a diagram for explaining the operation of the signal transmitting circuit relating to a twelfth embodiment of the present invention.
Figure 13:
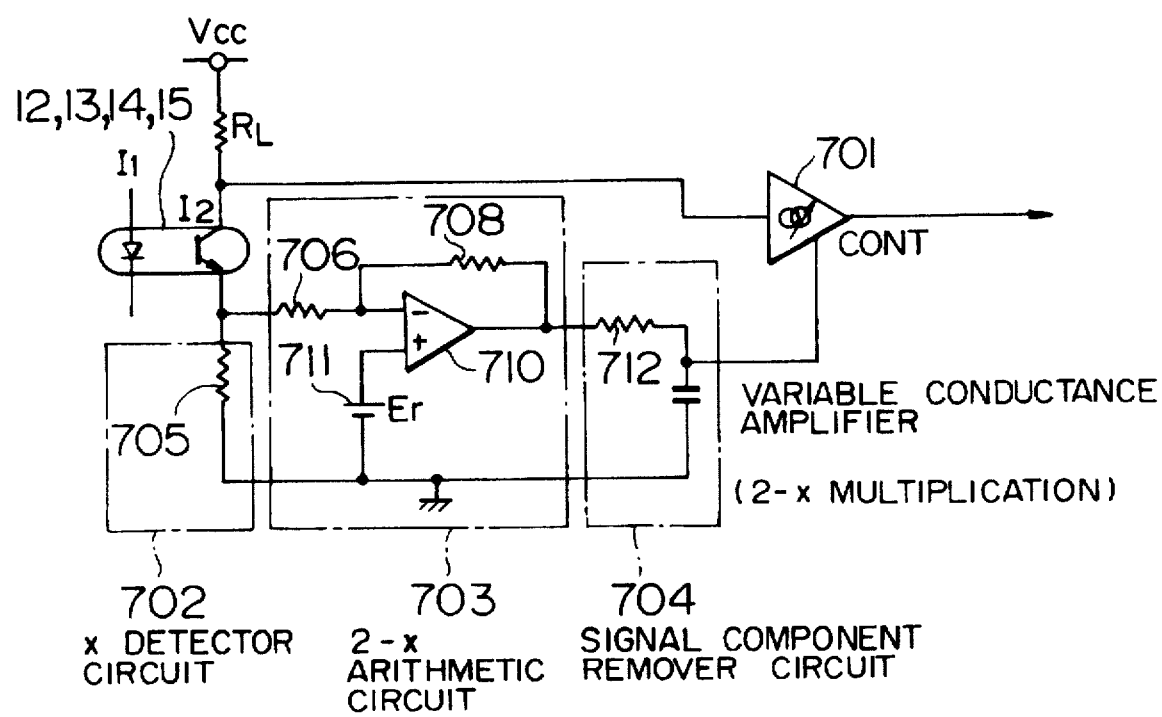
FIG. 13 is a circuit diagram of the signal transmitting circuit relating to the twelfth embodiment of the present invention.

FIGS. 12 and 13 are diagrams for explaining a twelfth embodiment of the present invention, FIG. 12 being an operation explanatory diagram of the photo-coupler variation compensation circuit 560 shown in FIG. 11 and FIG. 13 being a configuration diagram thereof. According to the present embodiment, in a signal transmission circuit (a signal sending circuit) for sending a signal to a circuit by using a photo-coupler, even if characteristics of a current transmission rate of the photo-coupler fluctuate around a standard value, this variation can be compensated and an optimum output can always be obtained. The present embodiment can be used for the photo-coupler variation compensation circuit 560 in the embodiment shown in FIG. 11, for example. The circuit of FIG. 13 is isolated from the power supply of the data terminal equipment, then in FIG. 1, the unit 560 is isolated from the source 551.

A photo-coupler is a kind of semiconductor, and the distribution of current transmission rate of a group of photo-couplers in the same production lot becomes such that the number of photo-couplers that have a certain standard value (a median) is the largest and the number of photo-couplers that have a value near the maximum value or near the minimum value is small, as is known in various distribution curves such as, for example, a normal distribution curve. Accordingly, there has been a problem that although it is desired to have a transmission power to be as high as possible within a limit range value, the transmission power actually obtained becomes low when standard photo-couplers of the largest number group are used.

In FIG. 12, the horizontal axis x shows a distribution of current transmission rate of photo-couplers, in which a standard value is shown as 1 by normalizing the distribution. In Other words, as explained above, when photo-couplers which belong to a certain group has current transmission rates that are distributed within a constant range and when this distribution is not random but forms a shape of a mountain based on statistical characteristics, the current transmission rate at the peak of this mountain-shaped distribution (the current transmission rate of the photo-couplers of which the sample number is the largest) is shown as a standard value 1 by normalizing this distribution. When the distribution is random, the median of this distribution is shown as a standard value 1 by normalizing the distribution. In FIG. 12, the vertical axis y shows output values of the signal transmission circuits (signal sending circuits) that use photo-couplers.

In FIG. 13, the signal transmission circuit (which corresponds to the photo-coupler variation compensation circuit 560 in FIG. 11 as described above) includes a voltage control type variable gain amplifier (a multiplier circuit) 701, a current transmission rate x detector circuit 702, a 2-x arithmetic circuit 703 and a signal component removing circuit 704. The detector circuit 702 has a resistor 705. The arithmetic circuit 703 has resistors 706 and 708, a reference power source (Er) 711 and a differential amplifier 710. The signal component removing circuit 704 has a resistor 709 and a capacitor 712. 12 designates a photo-coupler at the transmitter terminal side. As explained above, the current transmission rate x is a normalized value of the secondary current $I_2$/primary current $I_1$ of a photo-coupler.

Since the secondary output of the photo-coupler is proportional to the current transmitting rate (CRT) x when a constant input is applied to the primary side of the photo-coupler, the output y of the amplifier 701 at a non-adjusted time (a non-controlled time) is proportional to the current transmission rate of the photo-coupler, and is given by the following, as shown by a straight line (1) in FIG. 12:

$$y=x \tag{1}$$

(The outputs are normalized to show such that y=1 when x=1.) On the other hand, when k is a real number, a control input to the amplifier 701 (that is an output of the signal component removing circuit 704) is given by the following, as shown by a straight line (2) in FIG. 12:

$$y=k(2-x) \tag{2}$$

(In FIG. 12, the control outputs show an example where k =1.) Accordingly, the output of the amplifier 701 at a control time is given by the following by multiplying the expression (1) by the expression (2), as shown by a quadratic curve (3) in FIG. 12:

$$y = k\{x(2-x)\} \quad (3)$$
$$= k\{1-(x-1)^2\}$$

As is clear from the comparison of the straight line (1) with the quadratic curve (2), if the amplifier 701 has been designed such that the maximum allowable output (y=1) can be obtained when the current transmission rate is a standard value (x=1) when the amplifier 701 is non-controlled (the straight line (1)), the output of the amplifier 701 exceeds the maximum allowable output when the current transmission rate has deviated from the standard value to the right side of the diagram (x>1). Therefore, when the present embodiment is not applied, the output value of the amplifier 701 at the standard current transmission rate (x=1) has been set to a value lower than the maximum allowable output by about 3 dB to 5 dB, as explained above.

On the other hand, in the present embodiment, as is clear from the quadratic curve (3), the value of y becomes a maximum when x=1 and, therefore, the value of y will never exceed the value when x=1 even if the current transmission rate of the photo-coupler has deviated from the standard value (x=1) to any direction. Accordingly, it is possible to design the amplifier 701 such that almost the maximum allowable output (a maximum output) can be obtained when the current transmission rate x of the photo-coupler is the standard value 1. As a result, it is possible to obtain an output of always satisfactory efficiency by using a photo-coupler having various variation.

The present embodiment can be applied not only to the transmitter side photo-coupler 12 but also to the receiver side photo-couplers 13 to 15.

Thirteenth embodiment

The present embodiment is an improved photo-coupler variation compensation circuit 560 of the eleventh and twelfth embodiments.

Figure 15:
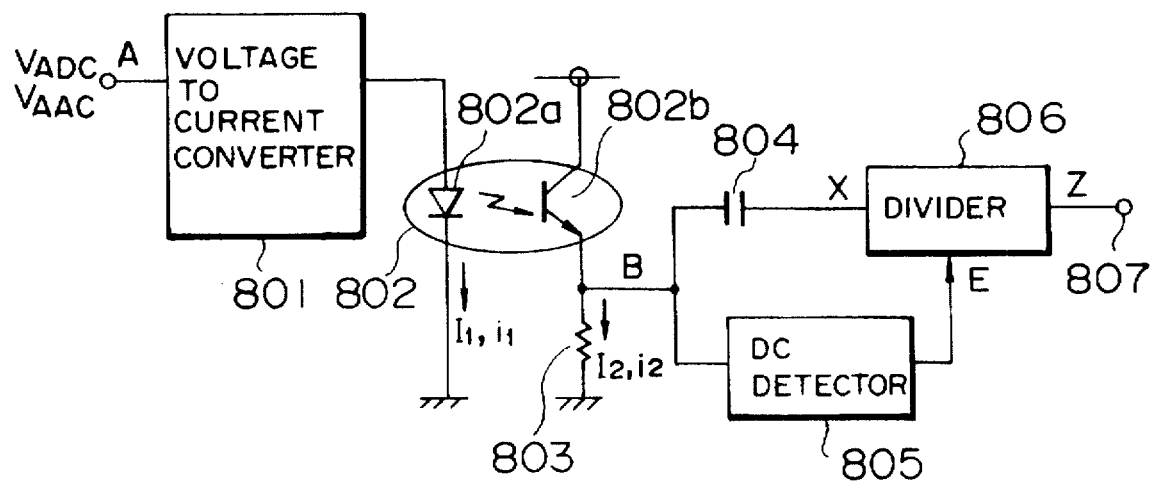
FIG. 15 is a block diagram for showing the compensation circuit of the photo-coupler relating to a thirteenth embodiment of the present invention.

FIG. 15 is a block diagram for showing one embodiment of the photo-coupler compensation circuit according to the present invention. 801 designates a voltage to current converter, 802 a photo-coupler, 802a a light emitting device, 802b a light receiving device, 803 a fixed resistor, 804 a capacitor, 805 a DC detector, 806 a divider and 807 an output terminal.

In FIG. 15, an input voltage A comprising a DC voltage $V_{ADC}$ and an AC voltage $V_{AAC}$ is converted to a current by the voltage to current converter 801, to drive the light emitting device 802a of the 802. With this arrangement, a light emitted from the light emitting device 802a is received by the light receiving device 802b, and a current corresponding to the received light volume is outputted from the light receiving device 802b. This current flows to the fixed resistor 803 and a voltage B proportional to this current is obtained. The voltage B is supplied to the capacitor 804 on one side to extract an AC voltage X and is supplied to the DC detector 805 on the other side to extract a DC voltage E. The AC voltage X is supplied to the divider 806 and is divided by the DC current E from the DC detector 805 and a division output Z is obtained in the output terminal 807.

Assume that a DC current (a primary DC current) which flows to the light emitting device 802a of the photo-coupler 802 is expressed as $I_1$, an AC current (a primary AC current) which flows to the light emitting device 802a is expressed as $i_1$, a DC current (a secondary DC current) which flows to the light receiving device 2b of the photo-coupler 2 is expressed as $I_2$, an AC current (a secondary AC current) which flows to the light receiving device 802b is expressed as $i_2$, and current transmission rates of a DC and an AC of the photo-coupler are expressed as $CTR_{DC}$ and $CTR_{AC}$ respectively. Then, the following relationships are obtained:

$$I_2 = CTR_{DC} * I_1$$
$$i_2 = CTR_{AC} * i_1$$

and when the resistance value of the fixed resistor 803 is expressed as R, the following relationship is obtained:

$$X = R*i_2 = CTR_{AC}*Ri_1$$
$$E = R*I_2 = CTR_{DC}*RI_1$$

where, the output Z of the divider 806 is $$Z = X/E = (CTR_{AC}/CTR_{DC})*(i_1/I_1)$$

When $CTR_{DC} = CTR_{AC}$, the following relationship is obtained even if there is a variation in the current transmission rate CTR between the photo-couplers:

$$Z = i_1/I_1 \quad (4)$$

When a conversion coefficient of the voltage to current converter 1 is expressed as $\alpha$, the expression (4) becomes as follows because $i_1 = \alpha V_{AAC}$ and $I_1 = \alpha V_{ADC}$:

$$Z = V_{AAC}/V_{ADC} \quad (5)$$

As is clear from the expression (5), in the present embodiment, the output Z is not affected by the current transmission rate CTR of the photo-coupler 802, and by stabilizing the DC voltage $V_{ADC}$ the sinal Z proportional to the AC voltage $V_{AAC}$ of the input A (that is, a signal component) can be obtained. When the DC voltage $V_{ADC}$ of the input A is stabilized at 1 V, for example, the signal voltage Z obtained at the output terminal 807 becomes equal to the AC voltage $V_{AAC}$ of the input A. Thus, the gain is obtained in the circuit 801 in this embodiment.

As the divider 806, a conventional divider can be use. As one example, a divider of a logarithmic system is available. According to this system, a multiplication input x and a division input y are logarithmically converted by a logarithmic amplifier and outputs of these are operated as follows by a subtractor:

$$Log(X/Y) = Log\ X - Log\ Y$$

and the above result log (X/Y) is inversely logarithmically converted by an inverse logarithmic amplifier.

As another example, a gilbert cell using a differential amplifier is available.

The divider according to the above logarithmic conversion system, however, uses $V_{BE}-I_C$ characteristics of a transistor for the logarithmic conversion and inverse logarithmic conversion. Therefore, this divider has a problem that this is affected by temperature, and the gilbert cell also has a problem that this requires a large current consumption.

When the above divider is used for the MODEM, the following problems occur.

When the logarithmic conversion system is used, there is a problem of temperature dependance, so that the gilbert cell which has improved the temperature dependance has to be used.

A DC is superimposed on the telephone circuit, and a minimum 20 mA is determined within Japan. In this case, the voltage at both ends of the circuit is not higher than 6 V at an off-hook time. Both a peak-to-peak value of the drive current of a signal to be sent to the circuit and a current for operating the circuit needs to be obtained within this voltage range. Accordingly, under this circumstance, a linear multiplier and divider to be used for the MODEM interface needs to operate under the condition of the supply power source of 3 V and 1 to 2 mA. However, the gilbert cell requires a power source of about 10 V and 10 mA and this is not suitable for the MODEM interface.

Figure 16:
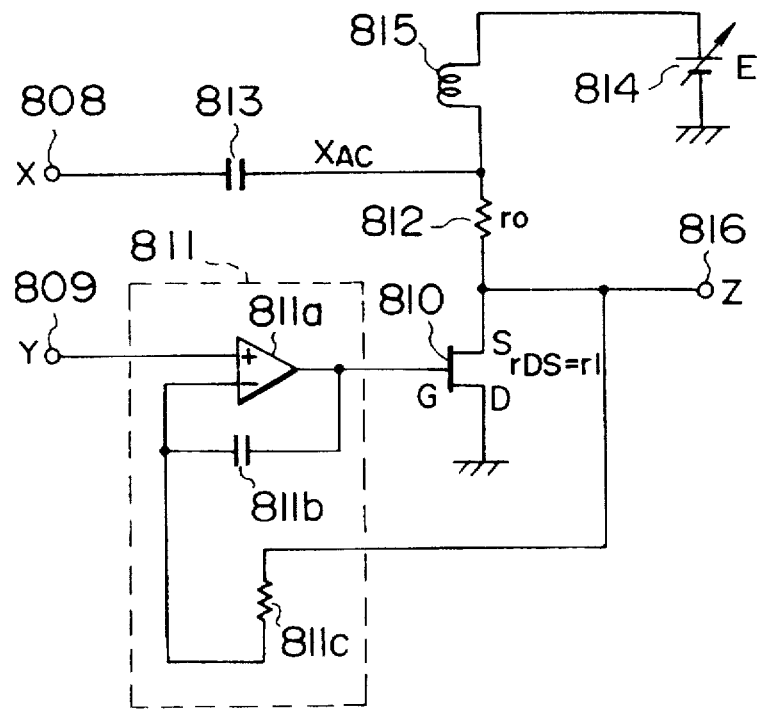
FIG. 16 is a circuit diagram for showing an example of the linear divider relating to the thirteenth embodiment of the present invention.

FIG. 16 is a circuit diagram for showing one detailed example of the linear divider which can solve the above problems. 808 and 809 designate input terminals, 810 an FET, 811 an integrator, 811a an operation amplifier, 811b a capacitor, 811c and 812 fixed resistors, 813 a capacitor, 814 a DC voltage source, 815 an inductor, and 816 an output terminal.

In FIG. 16, an input X from the input terminal 808 is supplied to the capacitor 813 and an AC current $X_{AC}$ of the input X is extracted and this AC current is supplied to a source S of a FET 10 through the fixed resistor 812. A drain D of the FET 810 is grounded. A DC voltage E of the DC voltage source 814 is supplied to the source S of the FET 810 through the inductor 815 and the fixed resistor 812. The source of the FET 815 is connected to the output terminal 816 and is also connected to the integrator 811. An output terminal of the integrator 811 is connected to a gate G of the FET 810.

In the integrator 811, a DC voltage $Z_{DC}$ of the output Z obtained at the output terminal 816 (accordingly, the source S of the FET 810) is supplied to the operation amplifier 811a as an inverse input through the fixed resistor 811c. As a non-inversed input of the operation amplifier 11a, an input Y of the DC voltage as a reference voltage from the input terminal 809 is supplied. An output of the operation amplifier 811a which is an integrated value of the difference between the DC voltage $Z_{DC}$ and the input Y is supplied to the gate G of the FET 810 as a gain control voltage. The capacitor 811b is provided between the input and output terminals of the operation amplifier 811a.

The FET 810 operates not in the active area but in the variable resistor area and almost no voltage is applied between the drain and the source. When the output of the integrator 811 is applied to the gate G of the FET 810 as a gain control voltage, a servo is applied so that the difference between the DC voltage $Z_{DC}$ of the output Z which is the voltage between the source and the drain of the FET 810 and the input Y which is the reference voltage becomes 0, that is, the DC voltage $Z_{DC}$ and the input Y become equal.

Assume that the resistance value between the source and the drain of the FET 810 is expressed as $r_1$ and the resistance value of the fixed resistor 812 is expressed as $r_0$, the DC voltage is given as follows:

$$Z_{DC}=Y \qquad (6)$$

$$Z_{DC}=(r_1/(r_0+r_1))*E \qquad (7)$$

Accordingly, from the expressions (6) and (7), the following relationship is obtained:

$$r_1/(r_0+r_1)=Y/E \qquad (8)$$

For the AC voltage, assuming that the impedance between the source and the drain of the FET 810 is equal to $r_1$, the following relationship is obtained:

$$Z_{AC}=(r_1/(r_0+r_1))*X_{AC} \qquad (9)$$

By substituting the expression (8) into the above expression, the following expression is obtained:

$$Z_{AC}=(X_{AC} \times Y)/E \qquad (10)$$

Based on the expression (10), the AC voltage $Z_{AC}$ of the output Z to be obtained at the output terminal 816 is calculated by dividing the $X_{AC}$ as a multiplicand input which is the AC voltage of the input X by the DC voltage E as a divisor input. Thus, the circuit operates as a linear divider, where the input Y is constant.

Further, this circuit also functions as a multiplier. In other words, based on the expression (10), the branch voltage $Z_{AC}$ of the output Z is obtained by dividing the product which is a multiplication of the input $X_{AC}$ by the multiplier input Y by the divisor input E. Accordingly, when the DC voltage E is constant, the branch voltage $Z_{AC}$ of the output Z becomes a product of the input $X_{AC}$ multiplied by the multiplier Y. From the above explanation, the circuit shown in FIG. 16 can function as the linear divider.

Figure 17:
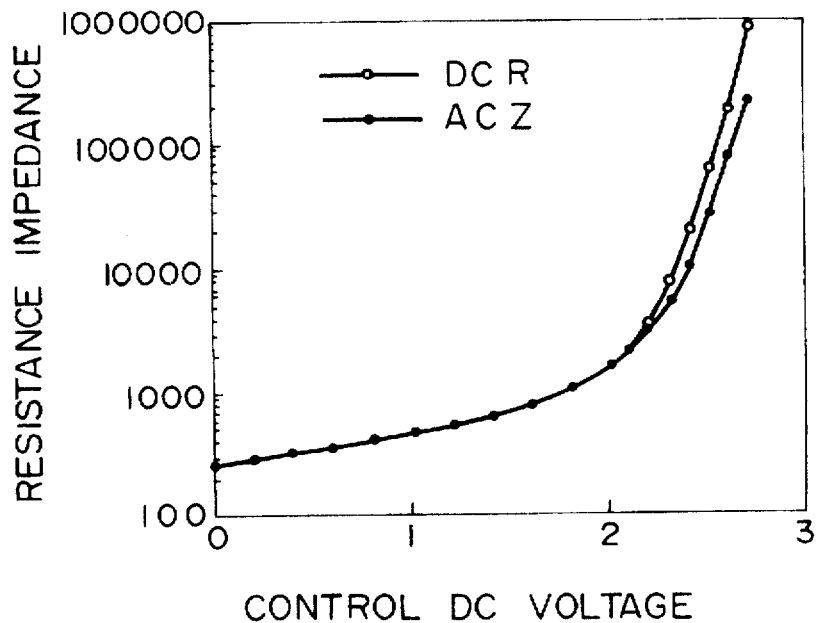
FIG. 17 is a diagram for showing the relation between a resistor impedance and the control DC voltage relating to the thirteenth embodiment of the present invention.

The relation between changes of the resistance impedance between the source and the drain and changes of the control DC voltage to be applied to the gate of the FET is non-linear as shown in FIG. 17. In this example, the FET 810 is used as a variable resistor and the resistance and the impedance between the source and the drain of the FET 810 are controlled by the integrator 811 and a servo is applied so that the DC voltage $Z_{DC}$ of the output Z becomes equal to the input Y. Thus, characteristics of the non-linearity as shown in FIG. 17 are improved so that the circuit can function as a linear divider.

As the power to be consumed in the above example, a DC current which flows to the resistor between the source and drain of the FET 810 and the power consumed by the integrator 811 are considered as shown in FIG. 16. However, in the former case, the current which flows to the resistor between the source and the drain of the FET 810 is about 0.2 mA and since this resistor is sufficiently small, the voltage generated in this resistor can be made to be as small as about 50 mV. Accordingly, the power consumption of this resistor can be set to about 0.01 mW. In the latter case, when the power source of the operation amplifier 811a is 3 V single and 0.3 mA, for example, the power consumption is 0.9 mW. The sum of these power consumption is very small. Commercially available photo-coupler variation compensation circuit according to the logarithmic system as described in the Japanese Patent Unexamined Publication No. JP-A-64-82815, the Japanese Patent Unexamined Publication No. JP-A-2-11014 and the Japanese Patent Unexamined Publication No. JP-A-2-193402, for example, show a power consumption of 128 mW. Whereas, in the present example, the power consumption is not larger than 1/100 of that of the commercially available dividers.

Further, in the above example, since the output $Z_{AC}$ shown in the expression (10) can be obtained, the precision of the multiplication and division is very high. Error factors which are considered to deteriorate the precision in FIG. 16 are the offset of the operation amplifier 811a and an incoincidence between the DC resistance value between the source and the drain of the FET 810 and the AC impedance. FIG. 17 is the characteristic diagram for showing one example of changes of resistance and impedance between the source and the drain at different control DC voltage values to be applied to the gate of the FET. According to this characteristic diagram, it is clear that when the control DC voltage is almost 2 V or above, there arises an incoincidence between the resistance and the impedance. However, FET's which make resistance and impedance to sufficiently coincide with each other are commercially available, and when these FET's are used the above problem is solved. Further, in the present example, it has become clear as a result of experiments that a deviation of a gain between a DC and an AC is within 5%. Accordingly, this ensures a high precision.

In FIG. 16, the inductor 815 is provided to prevent the AC voltage $X_{AC}$ from being leaked from the capacitor 813 to the DC voltage source 805 side.

Figure 18:
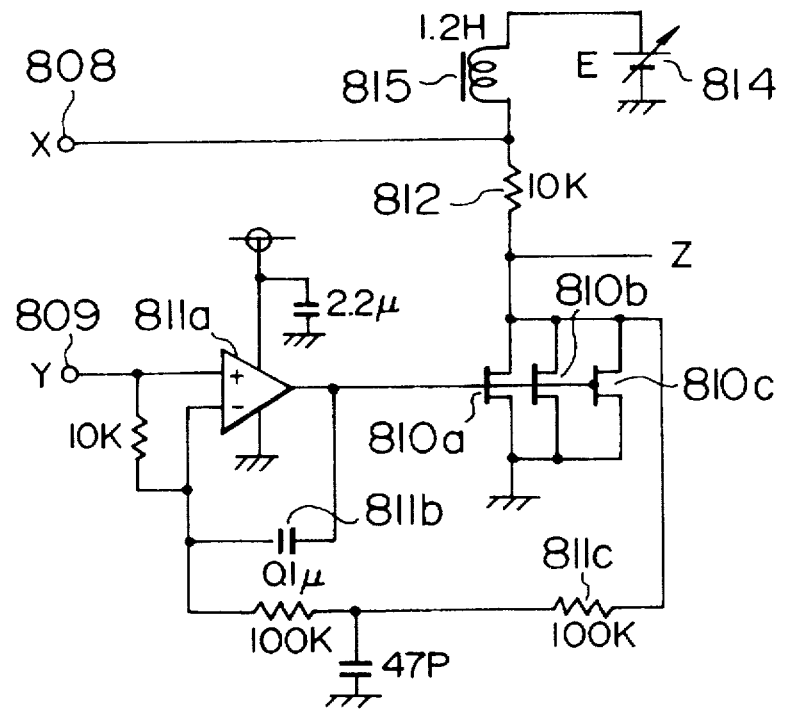
FIG. 18 is a circuit diagram used for evaluating the linear divider relating to the thirteenth embodiment of the present invention.

FIG. 18 is a circuit diagram which has been used for the experiments for evaluating the linear divider shown in FIG. 16. In FIG. 18, 810a, 810b and 810c designate FET's and portions corresponding to the portions of FIG. 16 are referenced with the same symbol marks and their repeated explanation will be omitted.

Referring to FIG. 18, three JI05SGR's (FET 810a, 810b and 810c) are provided in parallel for the FET's 810 so that a wide variable range can be taken for resistance values of the FET's. AD820 is used for the operation amplifier 811a and the cut-off frequency of the integrator 811 is 16 Hz. A signal frequency is 3 kHz and the inductance of the inductor 815 is about 1.2 H. A fixed resistor of 10 kΩ is provided between two input terminals of the operation amplifier 811a, the resistance value of the fixed resistor 811c is set to 100 kΩ, and a noise filter made of a fixed resistor of 100 kΩ and a capacitor of 47 pF is provided between the fixed resistor 811c and the operation amplifier 811a.

Figure 19:
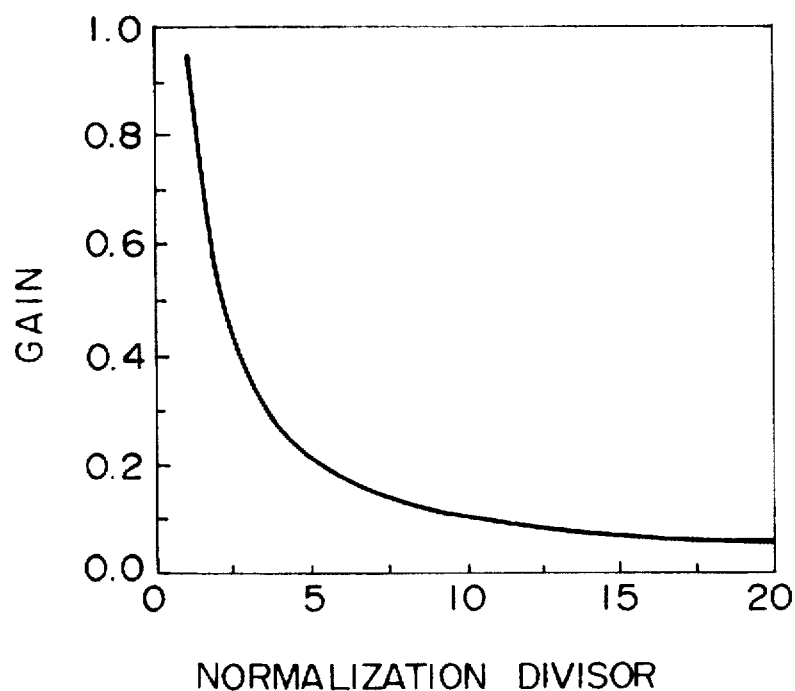
FIG. 19 is a diagram for showing the relation between the gain and the normalization divisor relating to the thirteenth embodiment of the present invention.
Figure 20:
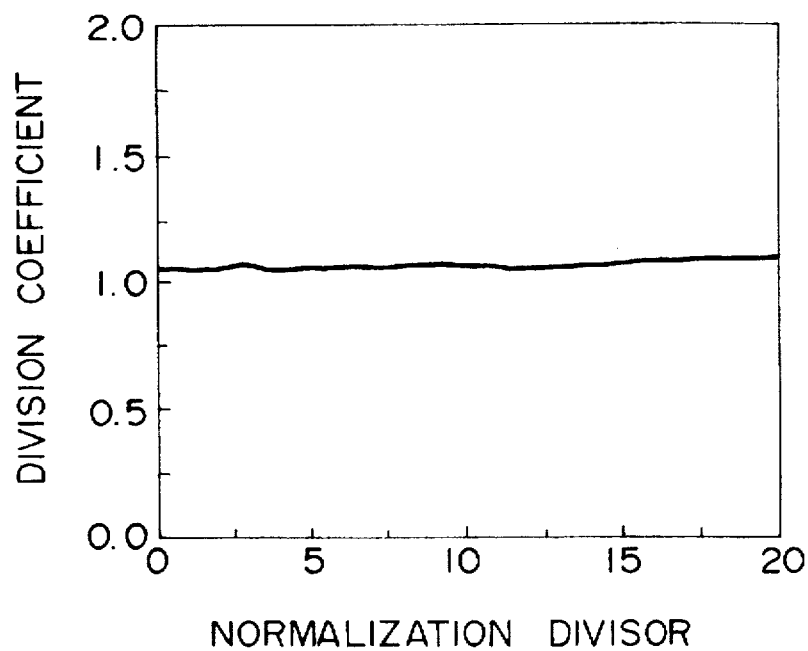
FIG. 20 is a diagram for showing the relation between the division coefficient and the normalization divisor relating to the thirteenth embodiment of the present invention.

In the above structure, the divisor input E has been changed within the range of 5 to 100 mV with the input Y constant at 5 mV. As a result, division characteristics as shown in FIG. 19 have been obtained. In FIG. 19, the horizontal axis is shown as a normalized divisor, which means E/Y. When a divisor coefficient is obtained from FIG. 19, it has become clear that the divisor coefficient is almost 1.057 as shown in FIG. 20. From this, it is clear that the linear divider shown in FIG. 18 carries out the following operation:

$$Z = (1.057/E)*X$$

Figure 21:
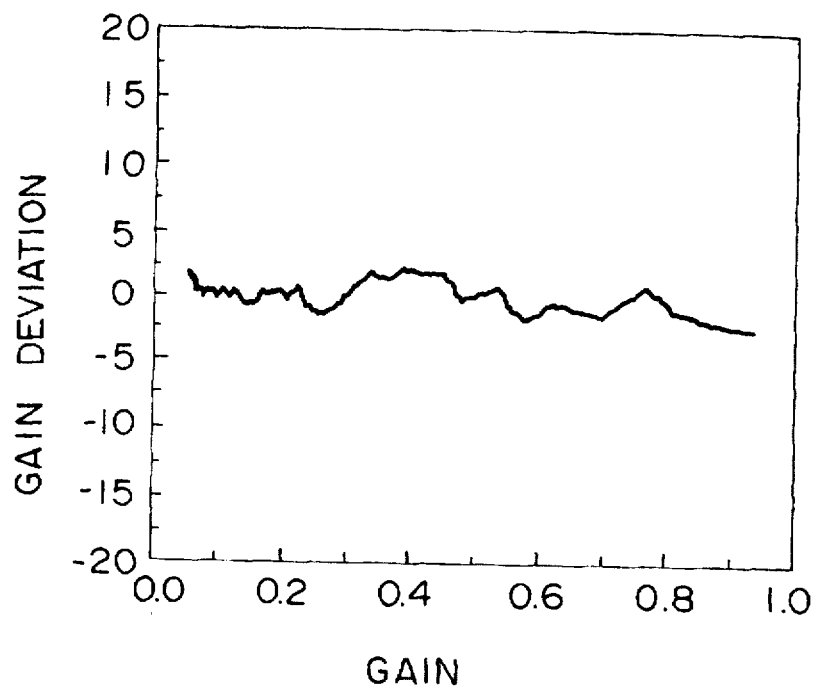
FIG. 21 is diagram for showing the relation between the gain deviation and the gain relating to the thirteenth embodiment of the present invention.

Further, deviations of the division gain obtained when the gain is changed by 20 times are as shown in FIG. 21, in which the deviations are within ±3%.

Figure 22:
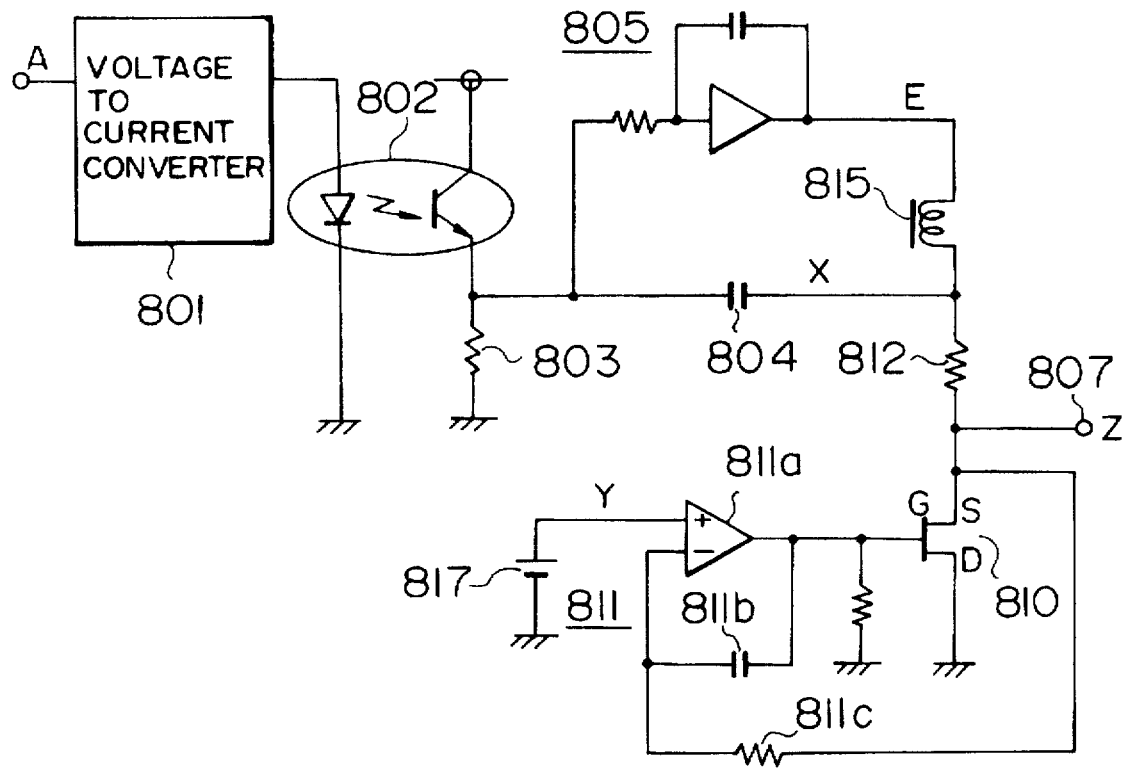
FIG. 22 is a circuit diagram of the linear divider relating to the thirteenth embodiment of the present invention.

FIG. 22 shows an application of the linear divider shown in FIG. 16 to the embodiment shown in FIG. 15. 817 designates a low voltage source and portions corresponding to the portions in FIGS. 15 and 16 are referenced by the same symbol marks.

Referring to FIG. 22, a voltage which occurs in the fixed resistor 803 at the secondary side of the photo-coupler 802 corresponds to the input X in FIG. 16. The AC voltage $X_{AC}$ of the input X is extracted by the capacitor 804 and is supplied to the source S of the FET 810 through the fixed resistor 812 as a multiplication input. The voltage which occurs in the fixed resistor 803 is supplied to the DC detector 805 and the DC voltage E is extracted and is supplied to the source S of the FET 810 through the inductor 815 and the fixed resistor 812. As the DC detector 805, an integrator is used, for example. An input Y as the reference voltage to be supplied to the operation amplifier 811a of the integrator 811 is supplied from the low voltage source 817.

According to the above-described structure, a division processing of high precision can be carried out with low power consumption, as explained with reference to FIG. 16 and others, and the output signal $Z_{AC}$ (the AC voltage of the output Z) of the level proportional to the input signal of the AC voltage $V_{AAC}$ of the input A can be obtained at the output terminal 807 regardless of the variations of the current transmission rate CTR of the photo-coupler 802.

Figure 23:
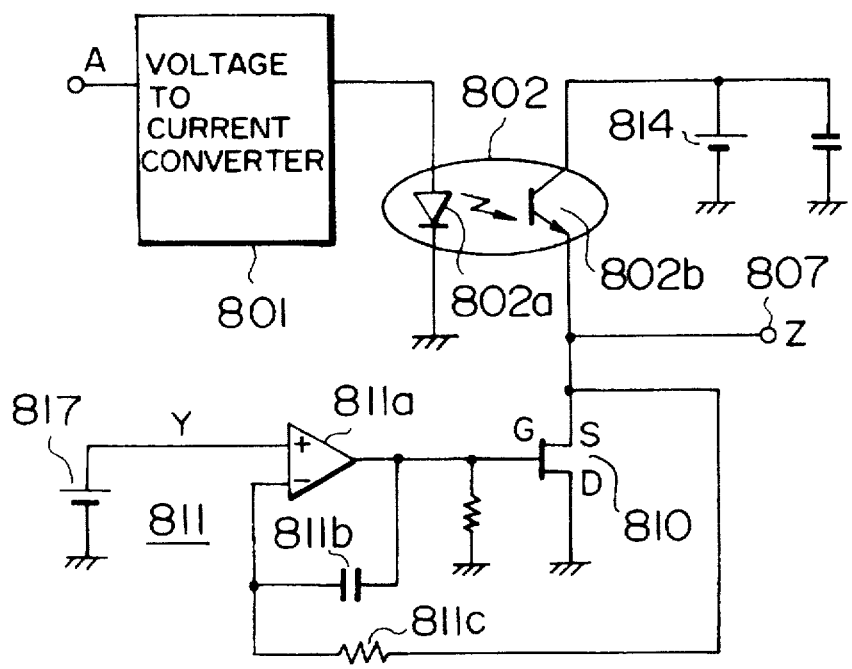
FIG. 23 is circuit diagram of the photo-coupler compensation circuit relating to the thirteenth embodiment of the present invention.

FIG. 23 is a circuit diagram which optimizes and makes more practical the compensation circuit of the photo-coupler shown in FIG. 22. While the AC extraction and the DC extraction have been carried out by separate circuits in the compensation circuit shown in FIG. 15, functionally duplicating portions are omitted to optimize the circuit in the compensation circuit shown in FIG. 23. 814' designates a constant voltage source and portions corresponding to the portions of FIG. 22 are referenced with the same symbol marks.

Referring to FIG. 23, the light receiving device 802b of the photo-coupler 802 is directly connected to the source of the FET 810 and a DC voltage E' is supplied to the light receiving device 802b from a constant voltage source 814'. Other structures are the same as those of the embodiment shown in FIG. 22.

In the present embodiment, the internal resistor of the light receiving device 802b is utilized as the fixed resistor 803 of FIG. 22, and a voltage divider (an attenuator) is structured by this internal resistor and the FET 810. A servo is applied to the FET 816 by the operation of the integrator 811 so that the DC voltage $Z_{DC}$ of the output Z obtained at the output terminal 807 becomes equal to the reference voltage Y, in the same manner as the embodiment shown in FIG. 22.

Figure 24:
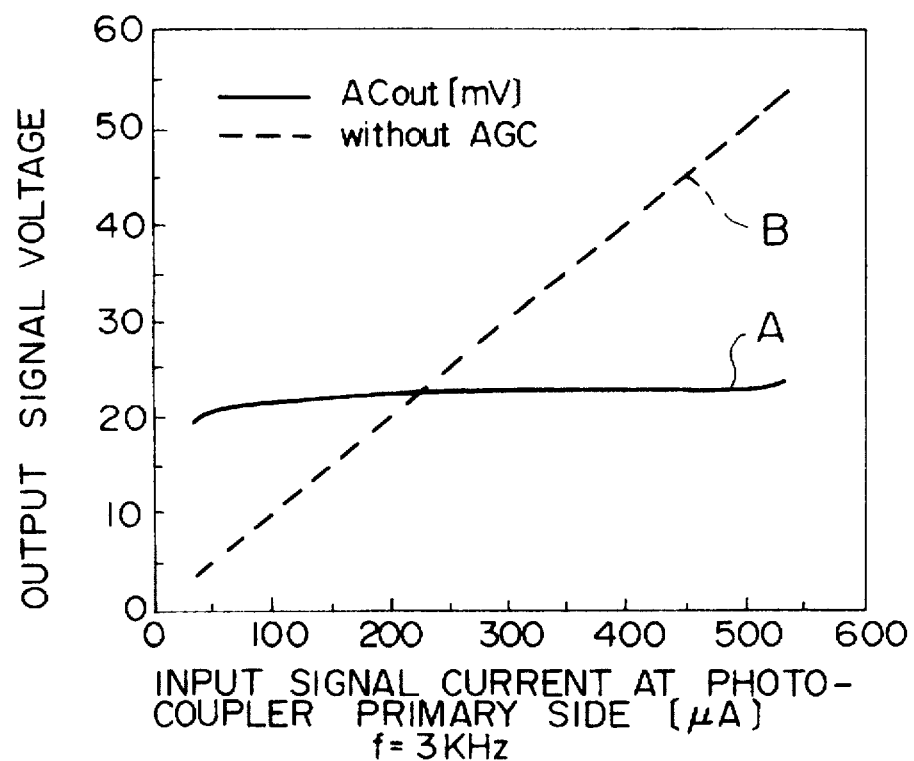
FIG. 24 is a diagram for showing the relation between the output signal voltage and the primary side input signal current of the photo-coupler relating to the thirteenth embodiment of the present invention.

FIG. 24 shows a result of an experiment of variations of the signal voltage $Z_{AC}$ at the output terminal 807 based on changes of the current transmission rate CTR of the photo-coupler 802 in the present embodiment. A solid line shows the result and a broken line shows variations of the output signal voltage of the photo-coupler 802 when the compensation of the present embodiment is not carried out.

As a method of this experiment, since it is very difficult to use samples of photo-couplers of different current transmission rates, a unit for making the primary current variable is provided at the primary side (the light emitting device 802a side) of the photo-coupler 802 and the primary current is sequentially changed with the AC voltage $V_{AAC}$ of the input A set at a constant amplitude. Thus, the current transmission rate CTR of the photo-coupler 802 is equivalently changed and the amplitude of the signal voltage $Z_{AC}$ at the output terminal 807 is measured.

As a result of the above-described experiment, the amplitude of the output signal voltage $Z_{AC}$ has been almost constant even if the primary current of the photo-coupler 802 was changed by 10 times, as shown in the solid line A in FIG. 24. On the other hand, if the compensation of the present embodiment is not carried out and when a similar experiment is carried out by using the voltage generated in the fixed resistor 803 in FIG. 22 as an output voltage, for example, the output signal voltage may be proportional to the changes of the primary current and therefore this may become as shown by the broken line B.

Figure 25:
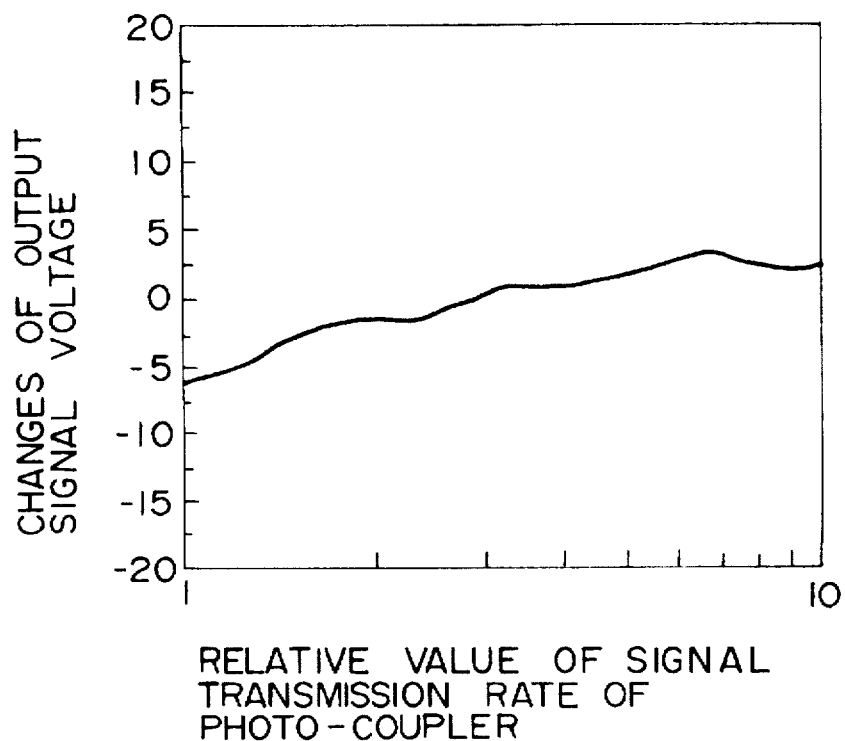
FIG. 25 is a diagram for showing the relation between the output signal voltage change and the relative value of the photo-coupler signal transmission rate relating to the thirteenth embodiment of the present invention.

FIG. 25 shows a result of changes of the output signal voltage in relation to variations of the relative values of the current transmission rate CRT of the photo-coupler based on the result of the experiment of the present embodiment shown in FIG. 24. According to this study, variations of the output signal voltage have been within about±5% against the range of 10 times of variations of the current transmission rate CRT of the photo-coupler.

As described above, almost a constant output signal voltage can also be obtained in the present embodiment without being affected by the variations of the current transmission rate CRT of the photo-coupler.

Figure 26:
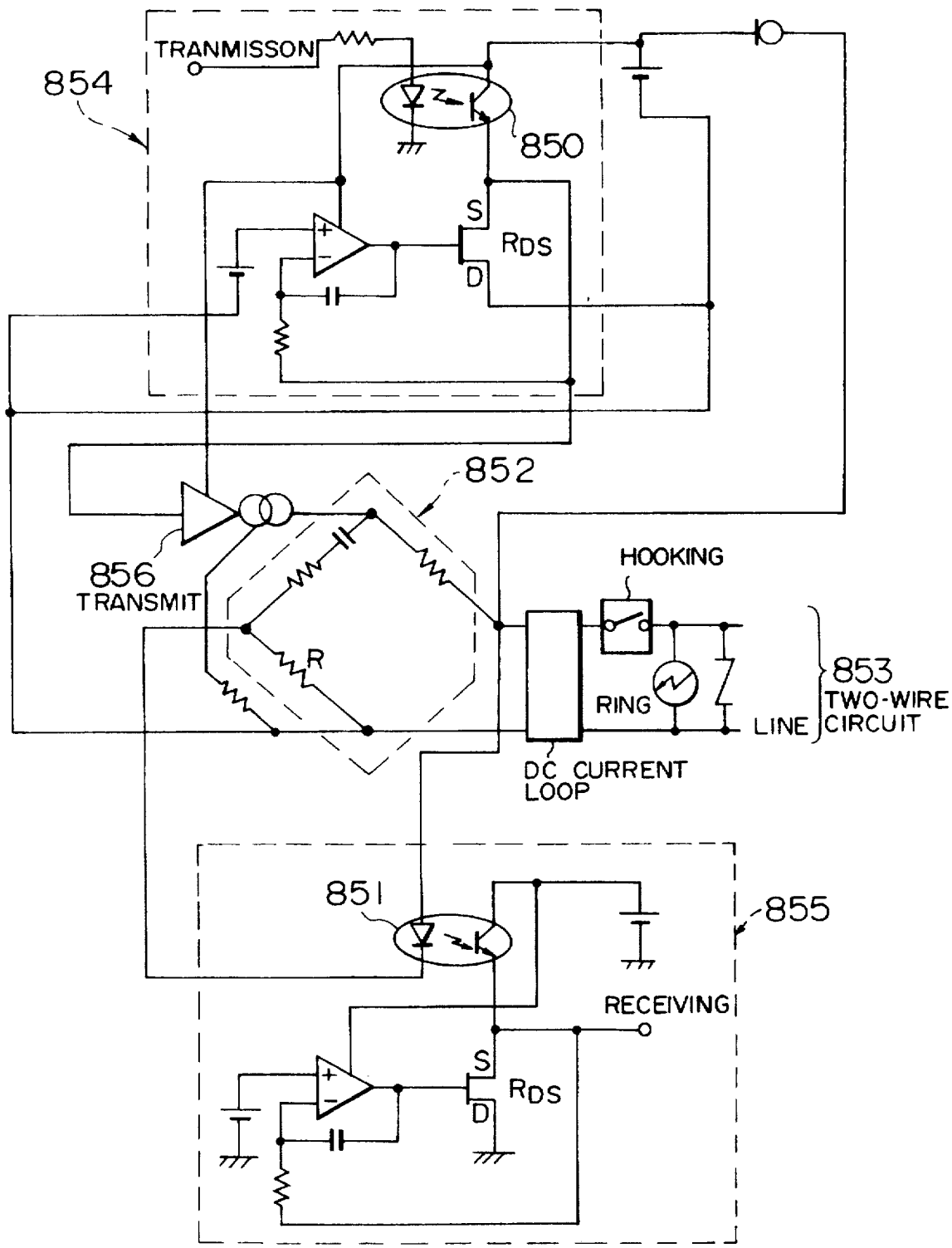
FIG. 26 is a circuit diagram of the variation compensation circuit relating to the thirteenth embodiment of the present invention.

FIG. 26 is a detailed circuit diagram of the case where the variation compensation circuit relating to the above-described explanation is applied to the MODEM interface portion, and 854 designates the compensation circuit explained above.

Referring to FIG. 26, as explained above, a transmission power is transmitted by the compensation circuit 854 via a transmission photo-coupler 850, without being affected by the current transmission rate of the photo-coupler 850, to a telephone circuit 853 through an AC current loop transmission amplifier 856 and a four-terminal bridge 852. With this arrangement, by suitably setting the transmission power at the transmitting side, a stable transmission of power becomes possible so that a maximum transmission power determined by the telecommunication enterprize law can be satisfied. Further, the MODEM can be made sufficiently compact and a sufficient isolation from the telephone circuit can be obtained, thus making it possible to provide a thin card which meets the standard of the PCMCIA/JEIDA TYPEI.

A similar compensation circuit 855 is also provided at the secondary side of the receiving photo-coupler 851 and this prevents the receiving signal from being affected by the current transmission rate of the receiving photo-coupler 851.

As explained above, according to the compensation circuit of the photo-coupler of the present invention, it is possible to transmit a signal through the photo-coupler at a constant level without being affected variations of the current transmission rate of the photo-coupler.

Further, according to the MODEM of the present invention, it is possible to transmit a signal to the telephone circuit with a stable transmission power even if a photo-coupler is connected with the telephone circuit at the line interface portion. This omits an adjustment operation and provides an overall compact thin card MODEM.

Fourteenth embodiment

The present embodiment is an improved line interface of the MODEM which can operate with a low power.

Figure 27:
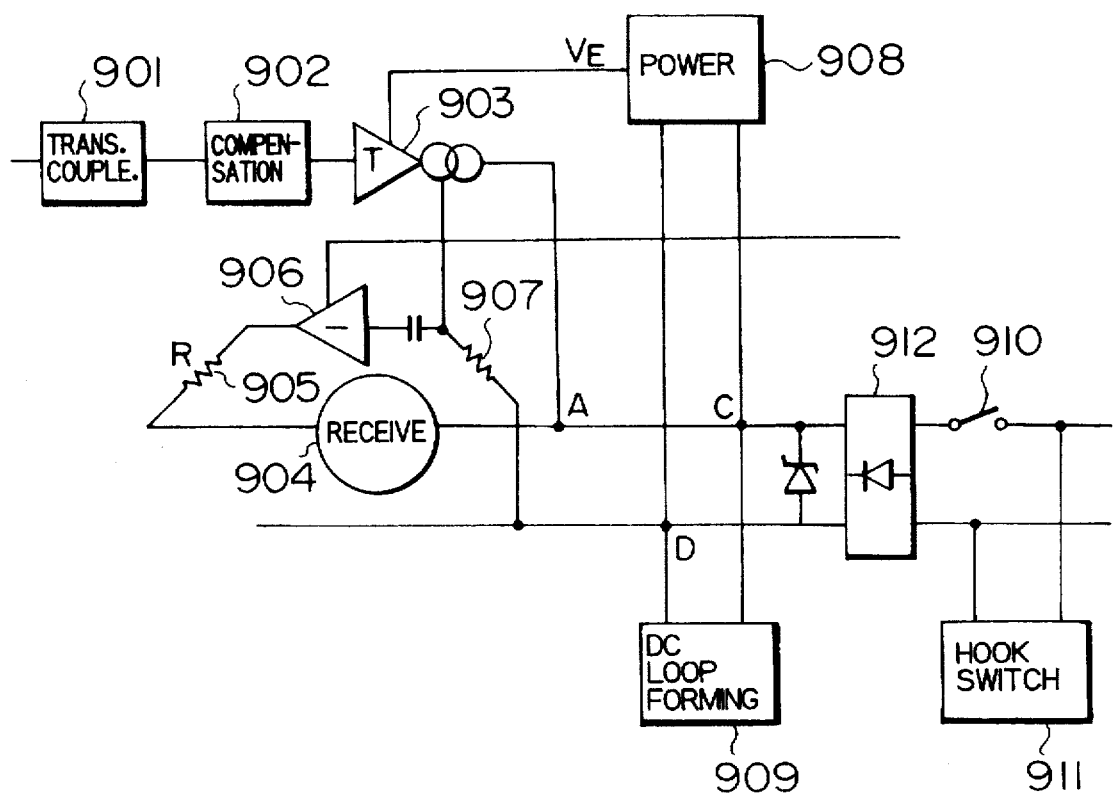
FIG. 27 is a configuration diagram of the MODEM line interface unit for showing a fourteenth embodiment of the present invention.

FIG. 27 is a configuration diagram for showing one embodiment of the line interface unit of the MODEM according to the present invention. 901 designates a transmission coupling portion, 902 a compensation portion, 903 a transmission driver portion, 904 a receiving portion, 905 a resistor for matching an impedance, 906 a cancel amplifier, 907 a resistor, 908 a power source portion, 909 a DC loop forming portion, 910 a hook-switch, 911 a call signal detecting portion, and 912 a rectifying portion.

Referring to FIG. 27, a transmission signal from a modulating and demodulating portion not shown is transmitted to the transmission driver portion 903 as a constant current output amplifier through the transmission coupling portion 901 and the compensation portion 902. The power of the transmission signal is amplified by the transmission driver portion and is then sent to the telephone circuit. In this case, the hook-switch 910 is closed by a transmission instruction at a terminal not shown or by a call detection at the call signal detecting portion 911, and a DC voltage from the telephone circuit is supplied to the power source portion 908 and a power source voltage E is formed. The power source voltage E becomes the power source voltage of the transmission driver portion 903.

As described above, when the power source voltage of the transmission driver portion 3 is supplied from the telephone circuit side, this power source voltage becomes independent of the power source voltage from a terminal unit, and it is possible to increase a maximum transmission power regardless of the power source voltage from the terminal unit even if this power source voltage is lowered to 3.3 V or 2.4 V as described above.

The transmission coupling portion 901 isolates the modulating and demodulating portion from the line interface unit, and a photo-coupler or a transformer is used for the transmission coupling portion. The compensation portion 902 compensates for variations of the characteristics of a photo-coupler when the photo-coupler is used for the transmission coupling portion 901, and this compensation portion is not necessary when a transformer is used. The DC loop forming portion 909 forms a DC loop for bypassing a surplus DC current other than the DC current which is consumed by the transmission driver portion 903 since the DC current which flows through the telephone circuit changes within the range of 20 to 120 mA. Further, the polarity of this DC current is inversed, and therefore, the rectifying portion 912 rectifies the DC current.

One of the signal lines of the telephone circuit is connected to one of the terminals of the resistor 905 through the signal receiving portion 904, and the other terminal of the resistor 905 is connected to the output terminal of the cancel amplifier 906. An input terminal of the cancel amplifier 906 is connected to the other output terminal of the transmission driver portion 903 and is also connected to the other signal line of the telephone circuit through the resistor 907.

Under the above-described structure, the impedance of the signal receiving portion 904 and the cancel amplifier 906 is almost 0, and the value of the resistor 907 is sufficiently smaller than the value of the resistor 905. Since the transmission driver 903 is a constant current amplifier, the output impedance of this transmission driver is ∞. Accordingly, only the resistor 905 is connected from the telephone circuit. By setting the resistance value R of the resistor 905 to be equal to an impedance RL of the telephone circuit, an impedance matching with the telephone circuit can be obtained.

A transmission signal to be outputted from the transmission driver portion 903 is supplied to the telephone circuit and is also tried to flow to the resistor 905 through the signal receiving portion 904. However, on the other hand, an output of the transmission driver portion 903 is amplification inversed by the cancel amplifier 906 and is supplied to the other terminal of the resistor 905. In this case, the amplitude of the output to be supplied from the transmission driver portion 903 to the cancel amplifier 906 and the amplification degree of the cancel amplifier 906 have been set in advance so that the potential of both ends of the resistor 905 become equal. Therefore, the transmission signal will never be supplied to the signal receiving portion 904 or the resistor 905.

As described above, consumption of power at the resistor 905 for an impedance matching can be eliminated at the time of a signal transmission. A transmission signal will never be received by the signal receiving portion 904 either. Accordingly, a maximum transmission power from the transmission driver portion 903 to the telephone circuit is increased further.

According to the present embodiment, the telephone circuit has a constant impedance of 600 Ω and therefore, all the transmission current from the signal transmission driver portion 903 flows to the telephone circuit, with a 100% efficiency.

A detailed circuit structure of the present embodiment when the photo-coupler is used as the transmission coupling portion 901 will be explained with reference to FIGS. 28 to 31.

Figure 28:
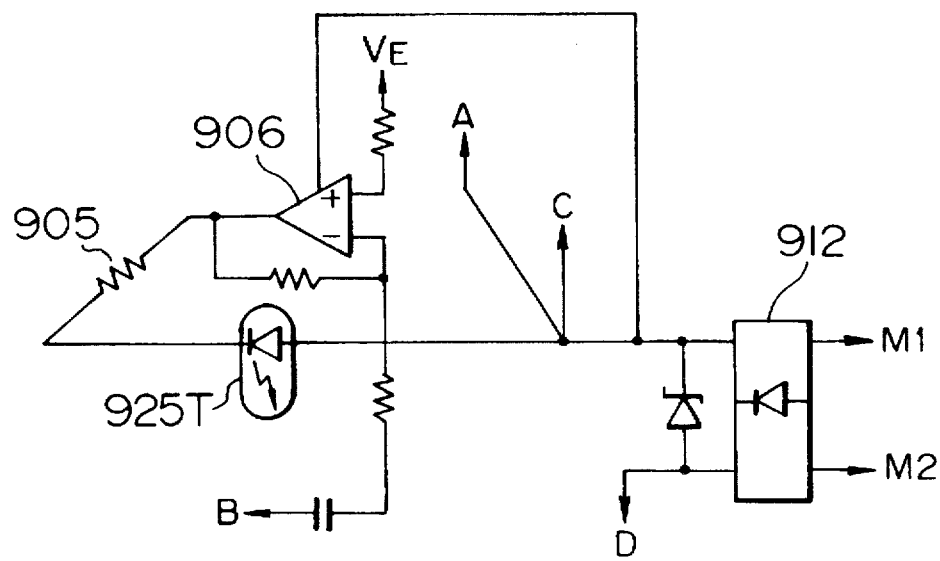
FIG. 28 is a circuit diagram for showing the four-wire to two-wire conversion portion relating to the fourteenth embodiment of the present invention.

FIG. 28 is a circuit diagram for showing a four-wire to two-wire conversion portion of FIG. 27, and portions corresponding to the portions of FIG. 27 are referenced by the same symbol marks.

In FIG. 28, the cancel amplifier 906 is structured by an operation amplifier, and amplification inverses an output of the transmission driver portion 903 (FIG. 27) which is supplied from a point B, and supplies the amplification inversed output to one terminal of the resistor 905 for matching an impedance. A point A is connected to the other output terminal of the transmission driver portion 903. Between the other terminal of the resistor 905 and the point A, a light emitting device 925T (a primary side) of the photo-coupler 925 for combining the receiving portion 904 (FIG. 27) is connected.

Figure 29:
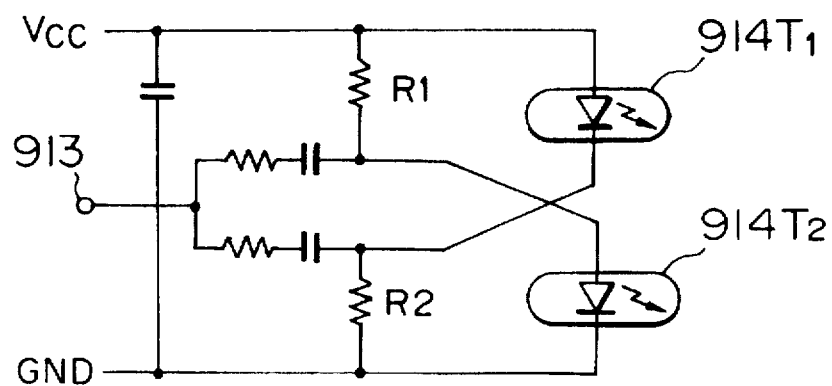
FIG. 29 a circuit diagram for showing the transmission coupling portion relating to the fourteenth embodiment of the present invention.

FIG. 29 is a circuit diagram for showing the transmission coupling portion 901 of FIG. 27. 913 designates an input terminal and $914T_1$ and $914T_2$ designate light emitting devices (primary side) of photo-couplers $914_1$ and $914_2$ respectively.

In FIG. 29, this embodiment shows that the transmission coupling portion 901 is made in a push-pull type so that a distortion of a signal waveform in the photo-coupler is removed and a signal is transmitted. A power source voltage $V_{CC}$ is directly applied to the anode of the light emitting device $914T_1$ and a power source voltage $V_{CC}$ is applied to the anode of the light emitting device $914T_2$ through a resistor $R_1$. The cathode of the light emitting device $914T_1$ is grounded through a resistor $R_2$ and the cathode of the light emitting device $914T_2$ is grounded directly.

When the amplitude of the modulated transmission signal to be supplied to the input terminal increases, the drive current of the light emitting device $914T_2$ increases and the drive current of the light emitting device $914T_1$ decreases. On the other hand, when the amplitude of this transmission signal decreases, the drive current of the light emitting device $914T_1$ increases and the drive current of the light emitting device $914T_2$ decreases.

Figure 30:
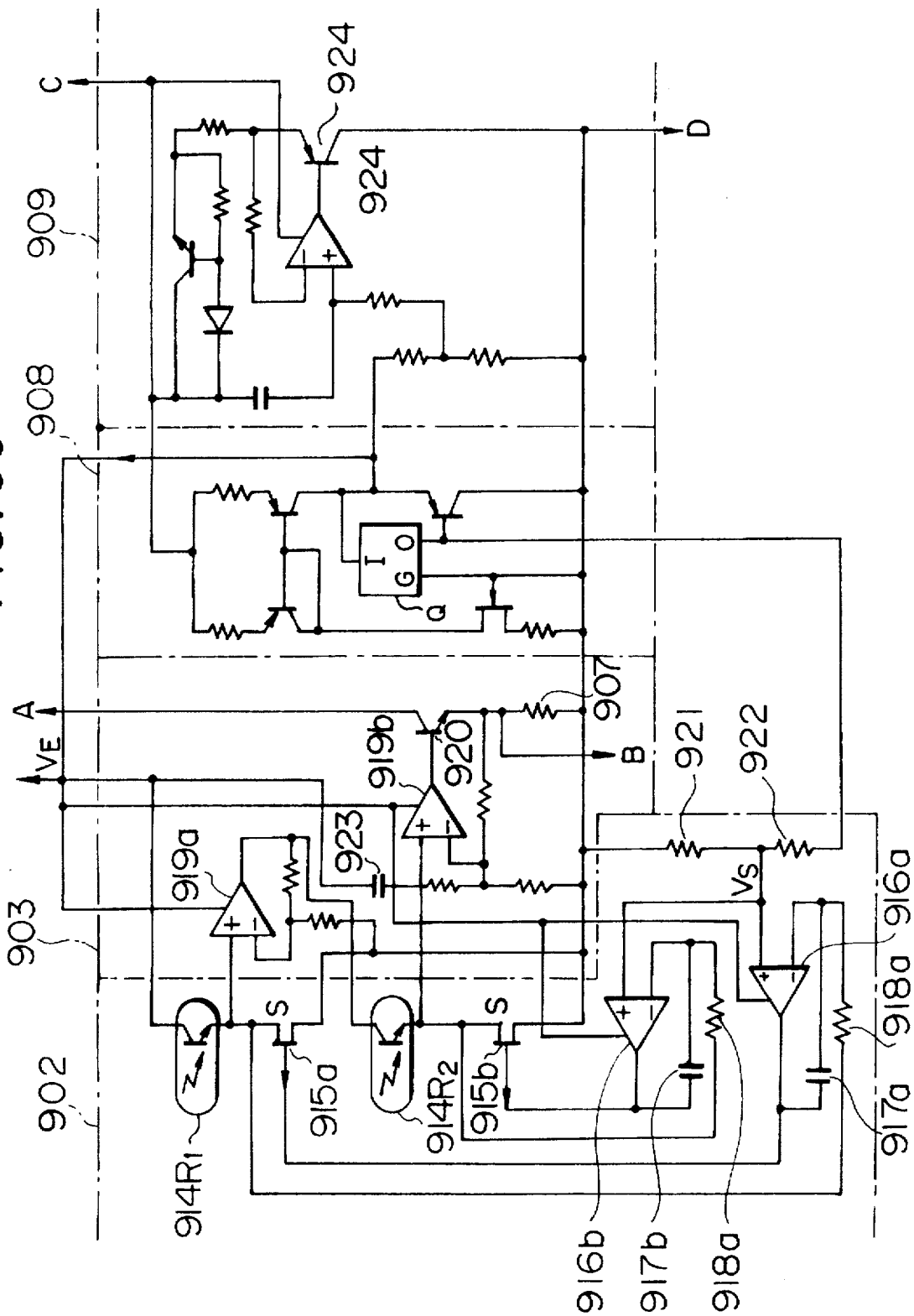
FIG. 30 is a circuit diagram for showing the compensation portion, the transmission driver portion, the power source portion and the DC loop forming portion relating to the fourteenth embodiment of the present invention.

FIG. 30 is a circuit diagram for showing the compensation portion 902, the transmission driver portion 903, the power source portion 908 and the DC loop forming circuit 909 in FIG. 27 respectively. $914R_1$ and $914R_2$ designate light receiving devices corresponding to the light emitting devices $914T_1$ and $914T_2$ in FIG. 29 respectively (that is, the secondary side of the photo-couplers $914_1$ and $914_2$), $915a$ and $915b$ designate FET (field effect transistors), $916a$ and $916b$ designate operation amplifiers, $917a$ and $917b$ designate capacitors, $918a$ and $918b$ designate resistors, $919a$ and $919b$ designate amplifiers, 920 designate a transistor, 921 and 922 designate resistors, 924 designates a capacitor, and 925 designate a transistor. Portions corresponding to the portions in FIG. 27 are referenced by the same symbol marks.

In FIG. 30, the light receiving device $914R_1$ structures the one photo-coupler $914_1$ together with the light emitting device $914T_1$ in FIG. 29, and receives a light from the light emitting device $914T_1$ and outputs a current (a secondary current) corresponding to the size of the light receiving volume. The light receiving device $914R_2$ structures the one photo-coupler $914_2$ together with the light emitting device $914T_2$ in FIG. 29, and receives a light from the light emitting device $914T_2$ and outputs a current (a secondary current) corresponding to the size of the light receiving volume. These secondary currents are supplied to the source S of the FET $915a$ and $915b$ respectively.

The operation amplifier $916a$, the capacitor $917a$ and the resistor $918a$ form an integrator, and this integrator and the FET $915a$ form a compensation circuit for compensating for variations of the characteristic of the photo-coupler $914_1$ (that is, the variations of the current transmission rate).

Similarly, the operation amplifier $916b$, the capacitor $917b$ and the resistor $918b$ form an integrator, and this integrator and the FET $915b$ form a compensation circuit for compensating for variations of the characteristic of the photo-coupler $914_2$ (that is, the variations of the current transmission rate).

The operation amplifiers $919a$ and $919b$ carry out a differential amplification and performs a push-pull combining.

A transmission signal transmitted by the photo-coupler $914_1$ is obtained in the source S of the FET $915a$ after the influence of variations of the characteristics of the photo-coupler $914_1$ has been compensated for by the compensation circuit. After the transmission signal has been amplified by the amplifier $919a$, an AC voltage (that is, a signal voltage) is extracted by the capacitor 923 and the signal is supplied to the operation amplifier $919b$ as an inversion input. A transmission signal transmitted by the photo-coupler $914_2$ is obtained in the source S of the FET $915b$ after the influence of variations of the characteristics of the photo-coupler $914_2$ has been compensated for by the compensation circuit, and is supplied to the operation amplifier $919b$ as a non-inversion input. This operation amplifier $919b$ structures a subtractor, so that signals of mutually opposite polarities are subtracted by this subtractor from the photo-couplers $914_1$ and $914_2$ of which variations have been compensated for and a signal transmission signal of two times of an amplitude can be obtained without any waveform distortion. The gate of the transistor 920 is controlled by this transmission signal and a transmission current corresponding to the transmission signal is obtained in the collector. This transmission current is sent to the telephone circuit from the point A in FIG. 28.

A difference of the secondary currents between the light receiving devices $914R_1$ and the $914R_2$ is supplied to the cancel amplifier 906 from the point B in FIG. 28.

The power source portion 908 is connected between the points C and D in FIG. 28 and forms a constant DC voltage $V_E$ from the DC voltage of the telephone circuit. This DC voltage $V_E$ is supplied as a power source voltage to the operation amplifiers $916a$ and $916b$ of the compensating portion 902 and to the operation amplifiers $919a$ and $919b$ of the transmission driver portion 903.

A reference voltage $V_S$ of an integration is supplied to the operation amplifiers $916a$ and $916b$ of the compensating portion 902, and this reference voltage $V_S$ can be obtained by dividing a constant DC voltage obtained by the power source portion 908 by a divider structured by the resistors 921 and 922.

The DC loop forming portion 909 is also connected between the points C and D in FIG. 28, and the transistor 924 is controlled according to the size of the DC current which flows through the telephone circuit. Thus, the bypass volume of the DC current is adjusted so that the size of the DC current supplied to the power source portion 908 is always constant. In the power source portion 908, a three-terminal regulator Q works to produce a constant voltage.

Figure 31:
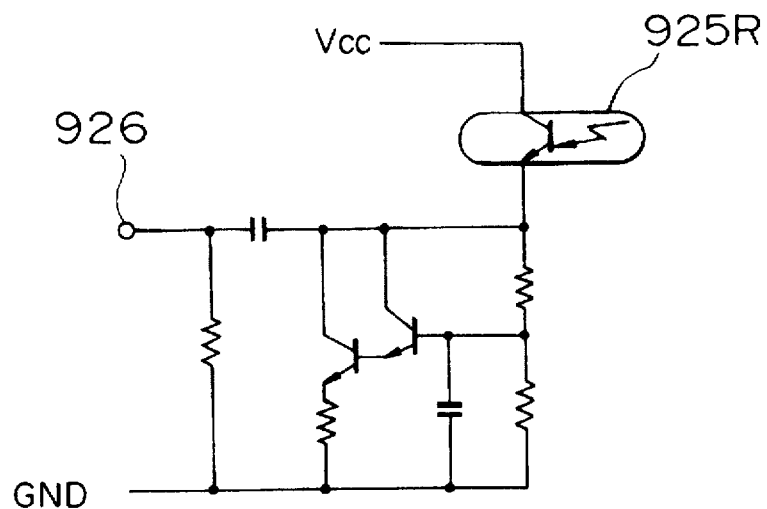
FIG. 31 is a circuit diagram for showing the signal receiving coupling portion relating to the fourteenth embodiment of the present invention.

FIG. 31 is a circuit diagram for showing the signal receiving coupling portion in FIG. 28, and 925 designates a light receiving device and 926 designates an output terminal.

In FIG. 31, the light receiving device 925R, together with the light emitting device 925T in FIG. 28, structures one photo-coupler and receives a light from the light emitting device 925T and outputs a secondary current corresponding to the receiving signal from the telephone circuit. This secondary current is converted to a voltage and is supplied as a received voltage to the demodulating circuit not shown from the output terminal 926.

A detailed circuit structure of the embodiment shown in FIG. 27 where a transformer is used as a transmission coupling portion 901 will be explained with reference to FIGS. 32 and 33.

Figure 32:
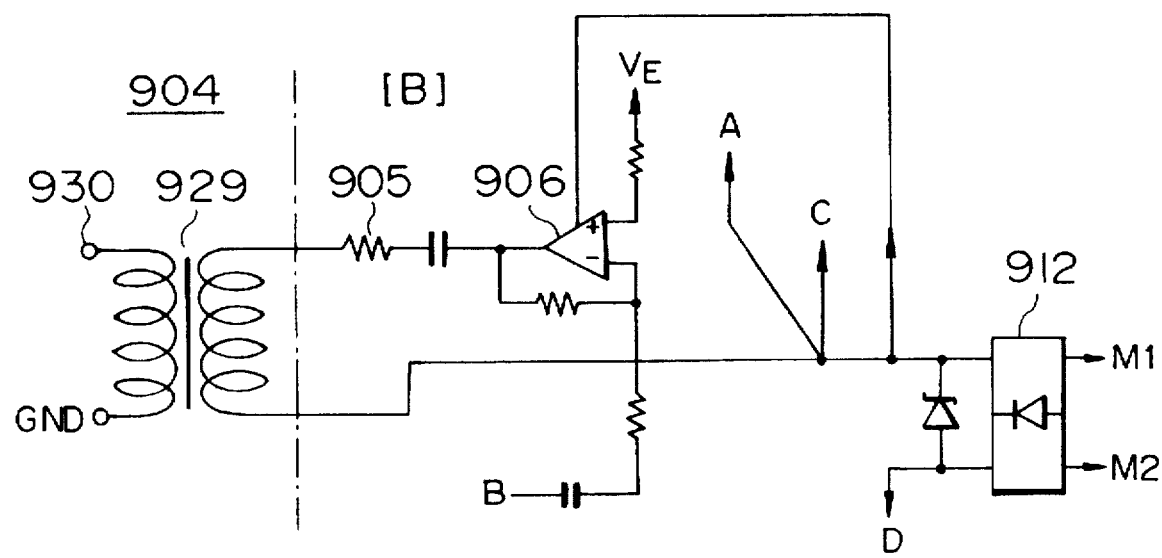
FIG. 32 is a circuit diagram for showing the coupling portion between the four-wire to two-wire conversion portion and the signal receiving portion relating to the fourteenth embodiment of the present invention.

FIG. 32 is a circuit diagram for showing a coupling portion between the four-wire to two-wire conversion portion and the signal receiving portion 904 in FIG. 27, and 929 designates a transformer at the signal receiving side and 930 designates an output terminal. Portions corresponding to the portions in FIG. 27 are referenced by the same symbol marks.

In FIG. 32, a secondary-side coil of the receiving-side transformer 929 is provided between one of the signal lines of the telephone circuit and the resistor 905 for matching the impedance and one end of the secondary-side coil is connected to the modulating and demodulating portion through the output terminal 930. The point A to be connected to the output terminal of the transmission driver portion 903 (FIG. 27) is connected to the telephone circuit.

Figure 33:
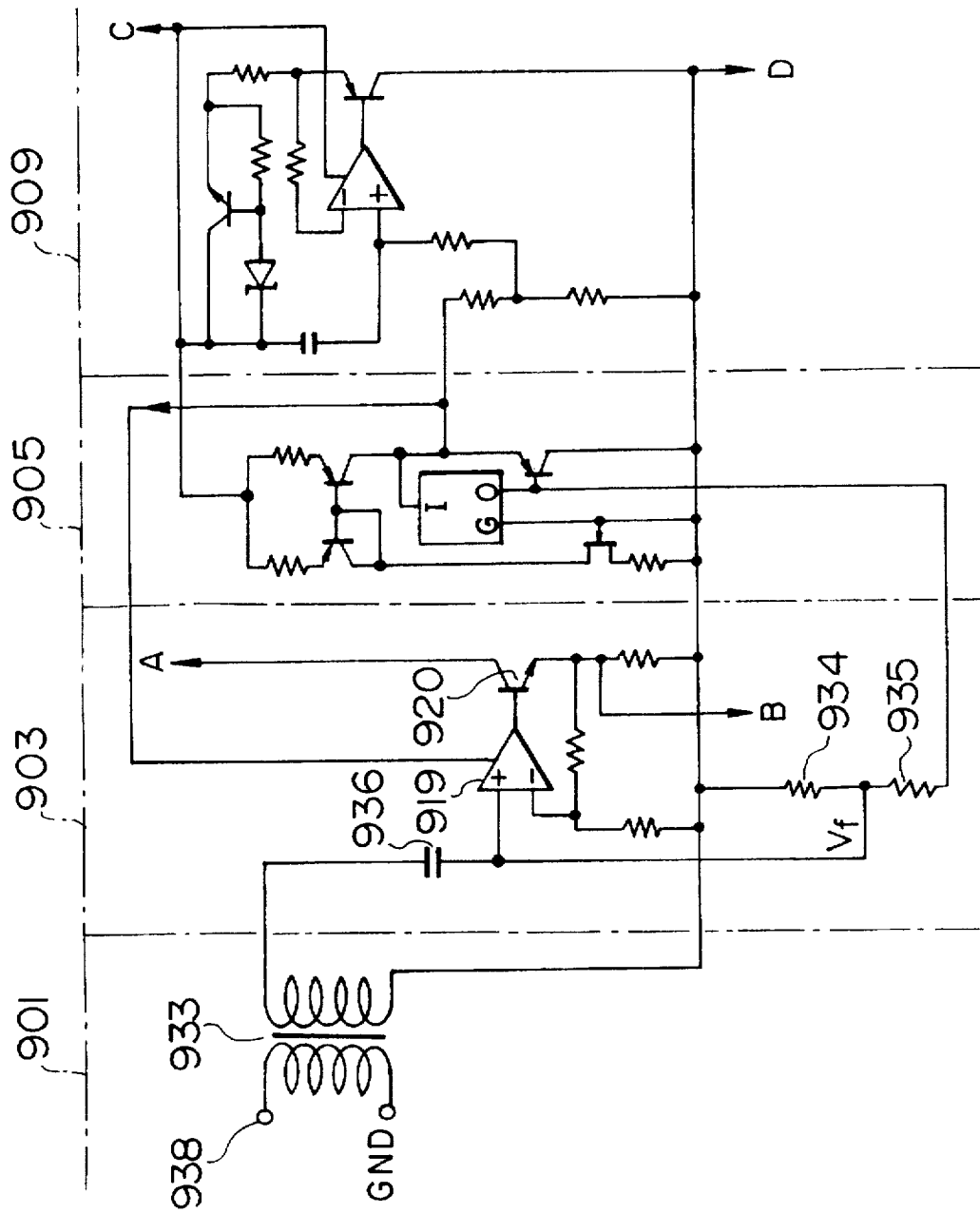
FIG. 33 is a circuit diagram for showing the transmission coupling portion, the transmission driver portion, the power source portion and the DC loop forming portion relating to the fourteenth embodiment of the present invention.
Figure 34:
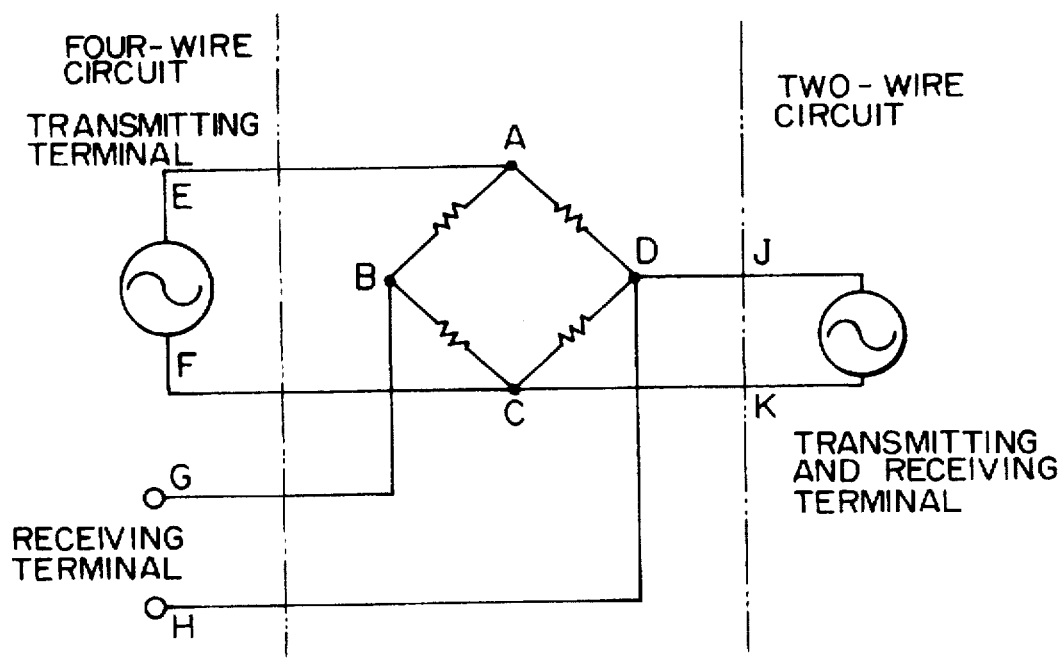
FIG. 34 is a diagram for explaining the operation of the present invention.
Figure 35:
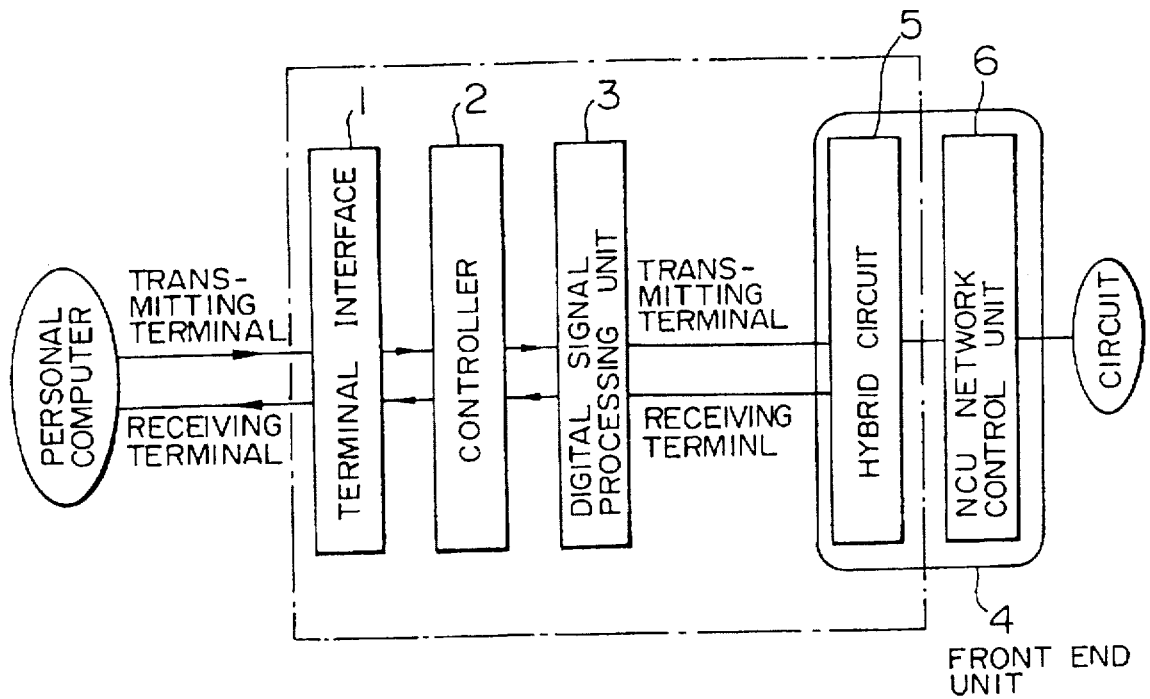
FIG. 35 is a block diagram of a modem.
Figure 36:
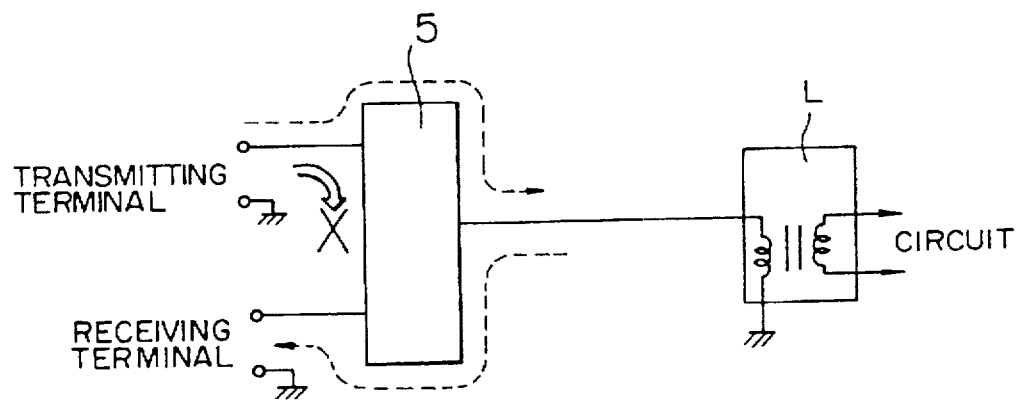
FIG. 36 is a configuration diagram of the front end portion of the MODEM that has been known conventionally.

FIG. 33 is a circuit diagram for showing the transmission coupling portion 901, the transmission driver portion 903, the power source portion 908 and the DC loop forming portion 909 in FIG. 27 respectively. 932 designates an input terminal, 933 a transmitter at the transmitting side, 934 and 935 resistors and 936 a capacitor. Portions corresponding the portions in FIG. 27 are referenced by the same symbol marks.

In FIG. 33, the transmission coupling portion 901 is structured by the transformer 933 at the transmitting side, and one terminal of the primary coil of the transformer 933 is connected to the modulating and demodulating portion. A transmission voltage obtained at the secondary-side coil of the transmission-side transformer 933 has its unnecessary DC component removed by the capacitor 936, and is then added by a prescribed DC voltage $V_f$ obtained by dividing a constant voltage from the power source portion 908 by the divider structured by the resistors 934 and 935, and is amplified by the operation amplifier 919. An output of this transmission voltage is used to control the transistor 920. A collector current of the transistor 920 is sent as a transmission current to the telephone circuit from the point A of FIG. 32 and is also supplied to the amplifier 906 from the point B.

When the transformer is used as described above, variations and distortions of the device are relatively small. Therefore, the use of the transmission driver portion which can operate by the circuit current does not require the compensation portion and the push-pull structure as required in the preceding embodiments. Thus, a large transmission power can be obtained even if the power source voltage of the terminal is lowered.

Further, even if an insertion loss is present in the transformer, this can be compensated for by making large the amplification rate of the transmission driver portion 903.

Further, since the transformer operates without a DC bias current, the line interface unit can operate securely even if the power source voltage of the terminal unit is lowered to any level. Therefore, the power source voltage of the terminal unit can be determined suitably without giving consideration to the power source voltage of the line interface unit.

As described above, according to the present invention, it is possible to eliminate the power consumption in the device for matching the impedance with the circuit, so that a maximum transmission power to the circuit can be stabilized to optimize the circuit.

Others

In the above embodiments 1 to 10, description has been made of the case where only photo-couplers are used as isolation interface devices. However, it is needless to mention that not only the photo-couplers but optically coupled devices can also be used for the same purpose. Further, in addition to the optically coupled devices, isolation interface devices such as Hall devices (as in items 1002 and 1004 of FIG. 37) and semiconductor relays can also be used.

In the above embodiments, it is also possible to use a wire impedance instead of one of the resistors of the balancing bridge circuit.

As explained above, according to the present invention, a balancing bridge circuit is provided between the four-wire circuit and the two-wire circuit, and either an isolation interface device such as a compact photo-coupler is provided between the terminals of the circuits, or a part of the structural element of the balancing bridge circuit provided between the four-wire circuit and the two-wire circuit has been substituted by an isolation interface device such as a compact photo-coupler. Therefore, it is possible to use the transmitting terminals and receiving terminals of the four-wire circuit by grounding them together, without short-circuiting the sides of the balancing bridge circuit. Further, it is possible to achieve a four-wire to two-wire conversion of the channel in a thin hybrid circuit by using a small number of compact circuit parts, without using a large transformer.

Further, it is also possible to prevent a leakage of common-mode noise of a wide frequency band reaching the two-wire circuit to the receiving terminal of the four-wire circuit, with an effect that the S/N ratio can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A MODEM comprising:

a modulation/demodulation device having transmitting and receiving terminals for modulating signals onto the transmitting terminals and demodulating signals received over the receiving terminals;

a DC-transmitting balancing bridge circuit provided between said transmitting and receiving terminals of said modulation/demodulation device and terminals of a two-wire circuit, the two-wire circuit being for carrying composite DC and AC currents that are transmitted through the bridge circuit;

a transmitting isolation interface device, having a primary side and a secondary side, the primary side of the transmitting isolation interface device being operatively interconnected to said transmitting terminal of said modulation/demodulation device, and the secondary side of the transmitting isolation interface device being operatively interconnected between balancing points on a first side of said bridge circuit, the transmitting isolation interface device being for electrically isolating the primary side of the transmitting isolation interface device from the secondary side of the transmitting isolation interface device; and a receiving isolation interface device having a primary side and a secondary side, the secondary side of the receiving isolation interface device being operatively interconnected to said receiving terminal of said modulation/demodulation device and the primary side of the receiving isolation interface device being operatively interconnected between balancing points on a second side of said bridge circuit, the receiving isolation interface device being for electrically isolating the primary side of the receiving isolation interface device from the secondary side of the receiving isolation interface device;

at least one of said receiving isolation interface device and said transmitting isolation interface device having the secondary side thereof, respectively, operatively interconnected with a load circuit for maintaining constant voltage when the load circuit receives DC and for maintaining constant current when the load circuit receives AC.

2. A MODEM comprising:

a modulation/demodulation device having transmitting and receiving terminals for modulating signals onto the transmitting terminals and demodulating signals received over the receiving terminals;

a DC-transmitting balancing bridge circuit provided between said transmitting and receiving terminals of said modulation/demodulation device and terminals of a two-wire circuit, the two-wire circuit being for carrying composite DC and AC currents that are transmitted through the bridge circuit;

a transmitting isolation interface device, having a primary side and a secondary side, the primary side of the transmitting isolation interface device being operatively interconnected to said transmitting terminal of said modulation/demodulation device, and the secondary side of the transmitting isolation interface device being operatively interconnected between balancing points on a first side of said bridge circuit, the transmitting isolation interface device being for electrically isolating the primary side of the transmitting isolation interface device from the secondary side of the transmitting isolation interface device; and a receiving isolation interface device having a primary side and a secondary side, the secondary side of the receiving isolation interface device being operatively interconnected to said receiving terminal of said modulation/demodulation device and the primary side of the receiving isolation interface device being operatively interconnected between balancing points on a second side of said bridge circuit, the receiving isolation interface device being for electrically isolating the primary side of the receiving isolation interface device from the secondary side of the receiving isolation interface device;

each of said transmitting isolation interface device and said receiving isolation interface device being an optically coupled device;

each of said transmitting isolation interface device and said receiving isolation interface device including:

a variable gain amplifier for amplifying an output of said isolation interface device;

a current transmission rate measuring circuit for measuring a current transmission rate of said isolation interface device; and a gain control circuit for controlling gain of said variable gain amplifier based on a measured current transmission rate so that a maximum output can be obtained from said variable gain control amplifier when said measured current transmission rate corresponds to a predetermined value.

3. A MODEM according to claim 2, wherein:

a current transmission rate X of each of said transmitting isolation interface device and said receiving isolation interface device is normalized for a reference value of one, where $0<X<2$ and X is a real number; and wherein said gain control circuit controls gain of said variable gain amplifier to be proportional to $k(2-X)$, where k is a real number.

4. A MODEM according to claim 2, wherein:

an output of said variable gain amplifier of each of said transmitting isolation interface device and said receiving isolation interface device, when said measured current transmission corresponds to the predetermined value, is less than or equal to an allowable maximum level for a signal transmission line.

5. A MODEM according to claim 3, wherein:

an output of said gain control circuit of each of said transmitting isolation interface device and said receiving isolation interface device is given by $k(2-X)$ and said variable gain amplifier of each of said transmitting isolation interface device and said receiving isolation interface device includes a multiplier circuit for multiplying an output of said isolation interface device by an output of said gain control circuit.

6. A MODEM comprising:

a modulation/demodulation device having transmitting and receiving terminals for modulating signals onto the transmitting terminals and demodulating signals received over the receiving terminals;

a DC-transmitting balancing bridge circuit provided between said transmitting and receiving terminals of said modulation/demodulation device and terminals of a two-wire circuit, the two-wire circuit being for carrying composite DC and AC currents that are transmitted through the bridge circuit;

a transmitting isolation interface device, having a primary side and a secondary side, the primary side of the transmitting isolation interface device being operatively interconnected to said transmitting terminal of said modulation/demodulation device, and the secondary side of the transmitting isolation interface device being operatively interconnected between balancing points on a first side of said bridge circuit, the transmitting isolation interface device being for electrically isolating the primary side of the transmitting isolation interface device from the secondary side of the transmitting isolation interface device; and a receiving isolation interface device having a primary side and a secondary side, the secondary side of the receiving isolation interface device being operatively interconnected to said receiving terminal of said modulation/demodulation device and the primary side of the receiving isolation interface device being operatively interconnected between balancing points on a second side of said bridge circuit, the receiving isolation interface device being for electrically isolating the primary side of the receiving isolation interface device from the secondary side of the receiving isolation interface device;

each of said transmitting isolation interface device and said receiving isolation interface device being an optically coupled device;

each of said optically coupled devices including:

a light emitting device; and a light receiving device for receiving light from said light emitting device and for generating an output voltage according to an intensity of said received light; and said MODEM having, at the secondary side of each of said transmitting isolation interface device and said receiving isolation interface device, a photo-coupler compensation circuit for compensating for variations and deviations of outputs of said light receiving device relative to a drive current of said light emitting device, said compensation circuit including:

AC extracting means for extracting an AC signal component from an output voltage of said light receiving device;

DC extracting means for extracting a DC signal component from an output voltage of said light receiving device; and dividing means for dividing said AC component by said component DC signal.

7. A MODEM according to claim 6, wherein said dividing means for each of said photo-coupler compensation circuits includes:

a field effect transistor, having a gate, a source, and a drain, for operating in a variable resistance area, with said AC signal component and said DC signal component supplied to the source via a fixed resistor; and an integrator, supplied with a reference voltage, for integrating a difference between said reference voltage and a DC voltage obtained between the source and the drain of said field effect transistor; and said MODEM supplies an output of said integrator as a control voltage to the gate of said field effect transistor and controls said DC voltage obtained between said source and said drain of said field effect transistor to become equal to said reference voltage.

8. A MODEM comprising:

a modulation/demodulation device having transmitting and receiving terminals for modulating signals onto the transmitting terminals and demodulating signals received over the receiving terminals;

a DC-transmitting balancing bridge circuit provided between said transmitting and receiving terminals of said modulation/demodulation device and terminals of a two-wire circuit, the two-wire circuit being for carrying composite DC and AC currents that are transmitted through the bridge circuit;

a transmitting isolation interface device, having a primary side and a secondary side, the primary side of the transmitting isolation interface device being operatively interconnected to said transmitting terminal of said modulation/demodulation device, and the secondary side of the transmitting isolation interface device being operatively interconnected between balancing points on a first side of said bridge circuit, the transmitting isolation interface device being for electrically isolating the primary side of the transmitting isolation interface device from the secondary side of the transmitting isolation interface device; and a receiving isolation interface device having a primary side and a secondary side, the secondary side of the receiving isolation interface device being operatively interconnected to said receiving terminal of said modulation/demodulation device and the primary side of the receiving isolation interface device being operatively interconnected between balancing points on a second side of said bridge circuit, the receiving isolation interface device being for electrically isolating the primary side of the receiving isolation interface device from the secondary side of the receiving isolation interface device;

each of said transmitting isolation interface device and said receiving isolation interface device being an optically coupled device;

each of said optically coupled devices including:
a light emitting device; and
a light receiving device for receiving light from said light emitting device and for generating an output voltage according to an intensity of said received light; and said MODEM having, at the secondary side of each of said transmitting isolation interface device and said receiving isolation interface device, a photo-coupler compensation circuit, the photo-coupler compensation circuit including:

a field effect transistor, having a gate, a source, and a drain, for operating in a variable resistance area, with an output signal of said light receiving device supplied to the source; and an integrator, supplied with a reference voltage, for integrating a difference between said reference voltage and a DC voltage obtained between the source and the drain of said field effect transistor;

said photo-coupler compensation circuit being for supplying an output of said integrator as a control voltage to the gate of said field effect transistor, controlling a DC voltage obtained between said source and said drain of said field effect transistor to become equal to said reference voltage, and obtaining from said source of said field effect transistor an output of a division which is an AC signal component of said light receiving device divided by a DC signal component of said light receiving device.

9. A MODEM comprising:

a modulation/demodulation device having transmitting and receiving terminals for modulating signals onto the transmitting terminals and demodulating signals received over the receiving terminals;

a DC-transmitting balancing bridge circuit provided between said transmitting and receiving terminals of said modulation/demodulation device and terminals of a two-wire circuit, the two-wire circuit being for carrying composite DC and AC currents that are transmitted through the bridge circuit;

a transmitting isolation interface device, having a primary side and a secondary side, the primary side of the transmitting isolation interface device being operatively interconnected to said transmitting terminal of said modulation/demodulation device, and the secondary side of the transmitting isolation interface device being operatively interconnected between balancing points on a first side of said bridge circuit, the transmitting isolation interface device being for electrically isolating the primary side of the transmitting isolation interface device from the secondary side of the transmitting isolation interface device; and a receiving isolation interface device having a primary side and a secondary side, the secondary side of the receiving isolation interface device being operatively interconnected to said receiving terminal of said modulation/demodulation device and the primary side of the receiving isolation interface device being operatively interconnected between balancing points on a second side of said bridge circuit, the receiving isolation interface device being for electrically isolating the primary side of the receiving isolation interface device from the secondary side of the receiving isolation interface device;

each of said transmitting isolation interface device and said receiving isolation interface device being an optically coupled device at least one of said receiving isolation interface device and said transmitting isolation interface device being configured in a push-pull configuration for canceling distortion in said receiving isolation interface device.

10. A MODEM according to claim 9, wherein said push-pull configuration includes a photo-coupler device.

11. A MODEM according to claim 9, wherein said push-pull configuration includes a current detector using a Hall device.

12. A MODEM according to claim 9, wherein each of said transmitting isolation interface device and said receiving isolation interface device is a transformer.

13. A MODEM according to claim 10, wherein at least one of said receiving isolation interface device and said transmitting isolation interface device has the secondary side thereof, respectively, operatively interconnected with a load circuit for maintaining constant voltage when the load circuit receives DC and for maintaining constant current when the load circuit receives AC.

* * * * *